United States Patent
Miyasaka et al.

(10) Patent No.: US 10,906,190 B2
(45) Date of Patent: Feb. 2, 2021

(54) SENSOR DEVICE, FORCE DETECTING DEVICE, AND ROBOT

(71) Applicant: Seiko Epson Corporation, Tokyo (JP)

(72) Inventors: Hideo Miyasaka, Okaya (JP); Hiroki Kawai, Matsumoto (JP); Mitsuhiro Tateyama, Minowa (JP); Hiroshi Komatsu, Shimosuwa (JP)

(73) Assignee: Seiko Epson Corporation

( * ) Notice: Subject to any disclaimer, the term of this patent is extended or adjusted under 35 U.S.C. 154(b) by 158 days.

(21) Appl. No.: 16/286,704

(22) Filed: Feb. 27, 2019

(65) Prior Publication Data
US 2019/0263000 A1    Aug. 29, 2019

(30) Foreign Application Priority Data

Feb. 28, 2018 (JP) ................. 2018-035257

(51) Int. Cl.
| | |
|---|---|
| B25J 13/08 | (2006.01) |
| G01L 1/16 | (2006.01) |
| G01L 5/00 | (2006.01) |
| B25J 19/02 | (2006.01) |

(52) U.S. Cl.
CPC .......... B25J 13/085 (2013.01); B25J 19/028 (2013.01); G01L 1/16 (2013.01); G01L 5/0061 (2013.01)

(58) Field of Classification Search
CPC ......... B25J 13/085; B25J 19/028; G01L 1/16; G01L 5/0061
See application file for complete search history.

(56) References Cited

U.S. PATENT DOCUMENTS

| | | | |
|---|---|---|---|
| 2013/0152700 A1* | 6/2013 | Kamiya | G01L 1/16 73/862.043 |
| 2013/0152701 A1* | 6/2013 | Oka | B25J 9/1633 73/862.044 |
| 2013/0233089 A1* | 9/2013 | Kawai | G01L 1/16 73/862.68 |
| 2014/0236354 A1 | 8/2014 | Kamiya et al. | |
| 2017/0059320 A1* | 3/2017 | Sugimoto | G01C 19/5614 |

FOREIGN PATENT DOCUMENTS

| | | |
|---|---|---|
| JP | 2000-314744 A | 11/2000 |
| JP | 2014-159967 A | 9/2014 |
| JP | 2015-087281 A | 5/2015 |
| JP | 2015-184010 A | 10/2015 |

* cited by examiner

*Primary Examiner* — Jonathan M Dunlap
(74) *Attorney, Agent, or Firm* — Harness, Dickey & Pierce, P.L.C.

(57) ABSTRACT

A sensor device includes a base body including a recess, a lid body configured to close an opening of the recess, a force detection element disposed in the recess and configured to output an electric charge according to a received external force, and an electronic component disposed in the recess and electrically connected to the force detection element. A separation distance between the electronic component and the lid body is larger than a separation distance between the force detection element and the lid body in the thickness direction of the lid body.

20 Claims, 17 Drawing Sheets

FIG. 5
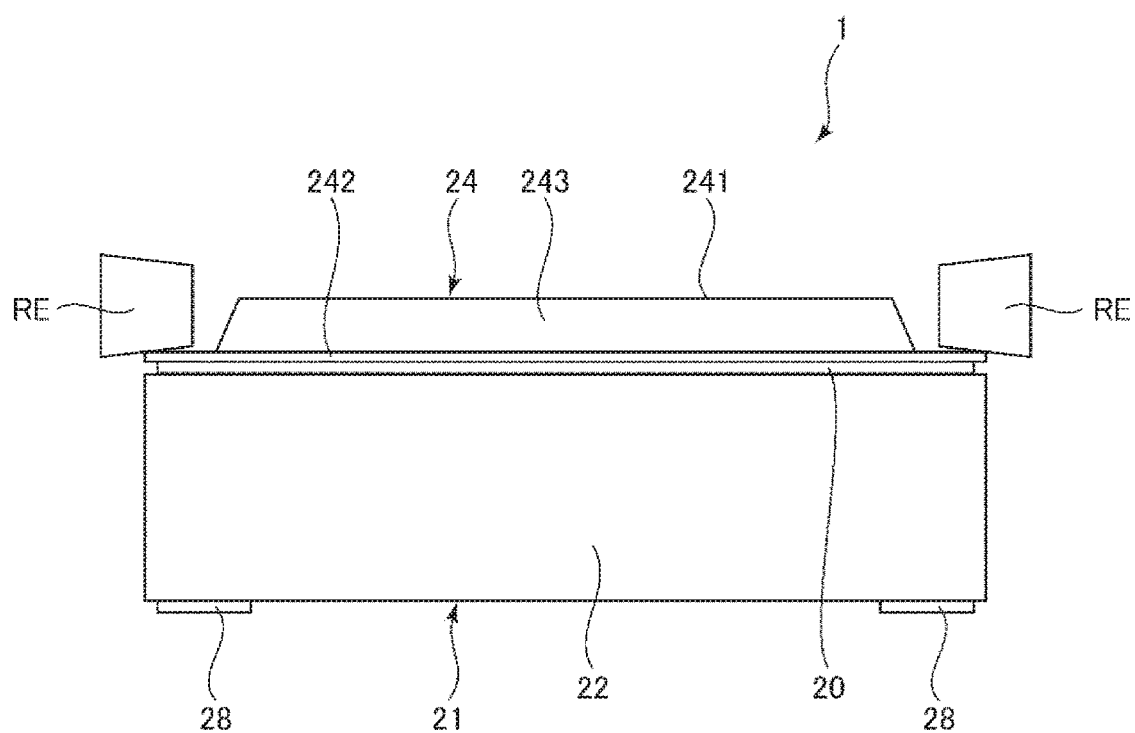
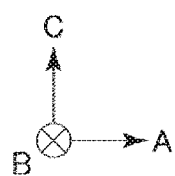

FIG. 7
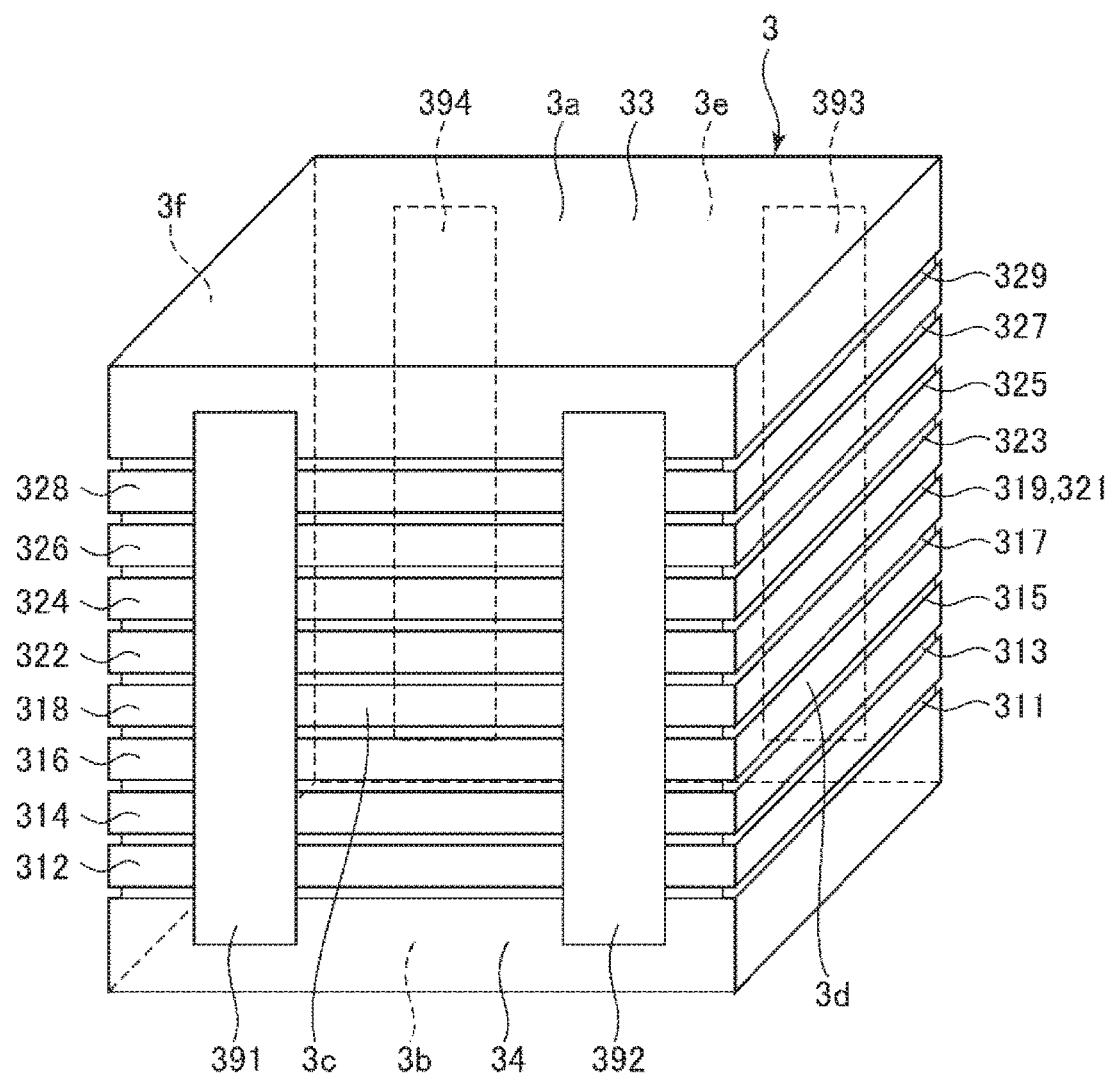
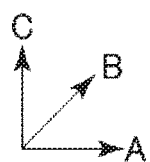

FIG. 17
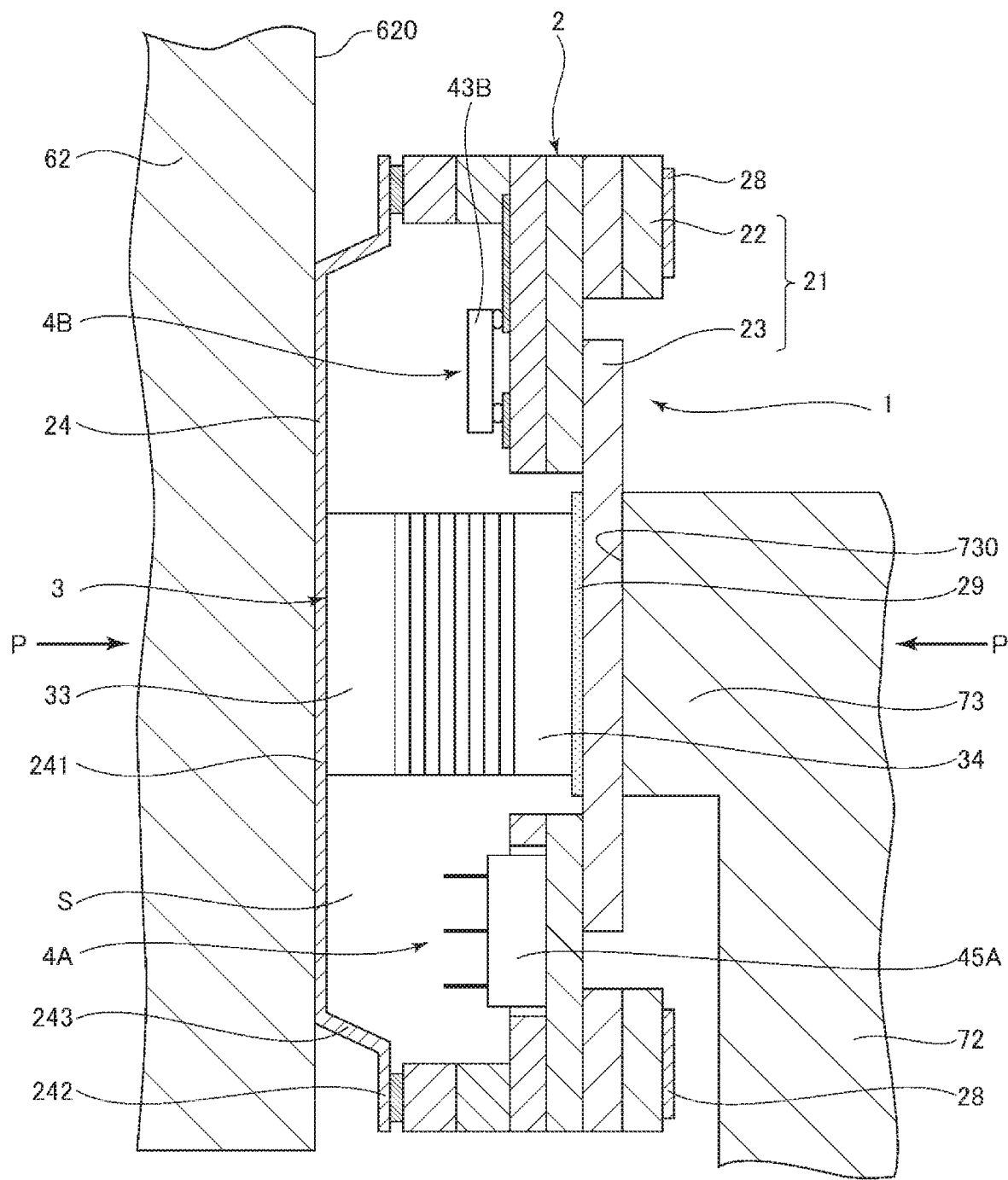
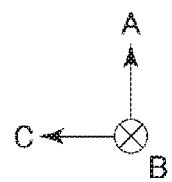

SENSOR DEVICE, FORCE DETECTING DEVICE, AND ROBOT

BACKGROUND

1. Technical Field

The present invention relates to a sensor device, a force detecting device, and a robot.

2. Related Art

A sensor device described in JP-A-2000-314744 (Patent Literature 1) is an acceleration sensor that can detect accelerations of an X axis, a Y axis, and a Z axis independently from one another. The sensor device includes a sensor base, a circuit board attached to the sensor base, a laminated piezoelectric element attached to the circuit board, a processing circuit that processes a signal output from the laminated piezoelectric element, and a lid body (a lid) that houses the laminated piezoelectric element and the processing circuit.

However, in such a sensor device, electronic components (e.g., a resistor, a capacitor, and an operational amplifier) included in the processing circuit interfere with the lid body depending on the sizes of the electronic components. Therefore, for example, when it is desired to sandwich the laminated piezoelectric element with the circuit board and the lid body, press the laminated piezoelectric element against the circuit board with the lid body, and preload the laminated piezoelectric element, the laminated piezoelectric element cannot be accurately preloaded because of the interference between the electronic components and the lid body. An acceleration detection characteristic is likely to be deteriorated.

SUMMARY

An advantage of some aspects of the invention is to provide a sensor device, a force detecting device, and a robot that can prevent interference between a lid body and electronic components and exert an excellent force detection characteristic.

An aspect of the invention is directed to a sensor device including: a base body including a recessed section; a lid body configured to close an opening of the recessed section; a force detecting section disposed in the recessed section and configured to output an electric charge according to a received external force; and an electronic component disposed in the recessed section and electrically connected to the force detecting section. A separation distance between the electronic component and the lid body is larger than a separation distance between the force detecting section and the lid body.

With this configuration, it is possible to effectively prevent interference (contact) between the lid body and the electronic component and preload the force detecting section with a desired compression force. Therefore, the sensor device that can exert an excellent force detection characteristic can be obtained. Since the contact between the lid body and the electronic component is prevented, it is possible to prevent damage, peeling, and the like of the electronic component. Reliability of the sensor device is improved.

In the aspect of the invention, it is preferable that the lid body includes, in a plan view from a thickness direction of the lid body: a center section; an outer edge section formed in a frame shape surrounding the center section and joined to the base body; and a frame-like connecting section located between the center section and the outer edge section and connecting the center section and outer edge section, and the force detecting section and the electronic component overlap the center section in the plan view.

With this configuration, for example, compared with when the electronic component overlaps the outer edge section, a separation distance between the electronic component and the lid body can be secured long. The separation distance can be secured larger.

In the aspect of the invention, it is preferable that, in a sectional view from a direction orthogonal to the thickness direction of the lid body, the connecting section is formed in a taper shape that connects an outer edge of the center section and an inner edge of the outer edge section.

With this configuration, it is easy to deform the lid body.

In the aspect of the invention, it is preferable that the sensor device includes a joining member located between the base body and the lid body and configured to join the base body and the lid body, and, in a sectional view from a direction orthogonal to the thickness direction of the lid body, a joining surface of the joining member with the lid body is located between an end on the lid body side of the force detecting section and an end on the lid body side of the electronic component.

With this configuration, deformation of the lid body is restricted because the lid body comes into contact with the force detecting section. The lid body can be prevented from being deflectively deformed further downward than the joining surface of the joining member with the lid body. Therefore, it is possible to more surely prevent the contact of the lid body and the electronic component.

In the aspect of the invention, it is preferable that the recessed section is sealed by the lid body, and an inside of the recessed section is in a decompressed state.

With this configuration, it is possible to effectively prevent deterioration and fluctuation in a characteristic of the circuit section.

In the aspect of the invention, it is preferable that an air pressure in the recessed section is 0.01 Pa or more and 1000 Ps or less.

With this configuration, it is possible to more effectively prevent deterioration and fluctuation in the characteristic of the circuit section.

In the aspect of the invention, it is preferable that an inert gas is filled in the recessed section.

With this configuration, it is possible to effectively prevent deterioration and fluctuation in the characteristic of the circuit section.

In the aspect of the invention, it is preferable that the sensor device includes a circuit section including the electronic component and configured to convert the electric charge output from the force detecting section into a voltage.

With this configuration, the force detecting section and the circuit section can be disposed closer to each other. An electric charge output from the force detecting section can be accurately processed with low noise. Therefore, the sensor device can accurately detect a received external force.

In the aspect of the invention, it is preferable that the circuit section includes, as the electronic component, at least one of a resistor to which the electric charge is input, a charge accumulating section that accumulates the electric charge, and an amplifier that amplifies a voltage by the electric charge.

With this configuration, the sections are protected from moisture (humidity). It is possible to prevent deterioration and fluctuation in a circuit characteristic of the circuit section due to humidity.

In the aspect of the invention, it is preferable that the force detecting section includes: a first piezoelectric element configured to output a first electric charge according to an external force in a first direction; and a second piezoelectric element configured to output a second electric charge according to an external force in a second direction different from the first direction, the circuit section includes: a first circuit section configured to process the first electric charge; and a second circuit section configured to process the second electric charge. In a plan view of the base body, the first circuit section is located on one side of the force detecting section and the second circuit section is located on another side.

With this configuration, the first circuit section and the second circuit section can be disposed apart from each other as far as possible in the recessed section. Therefore, interference between the first circuit section and the second circuit section is reduced. It is possible to effectively prevent noise from the second circuit section from being superimposed on the first electric charge and, conversely, noise from the first circuit section from being superimposed on the second electric charge. Therefore, the first electric charge can be accurately processed by the first circuit section. The second electric charge can be accurately processed by the second circuit section. As a result, it is possible to obtain the sensor device that can accurately detect a received external force and exert excellent force detection characteristic.

In the aspect of the invention, it is preferable that, in a plan view of the base body, the first circuit section and the second circuit section are disposed symmetrically with respect to the force detecting section.

With this configuration, it is possible to substantially equalize circuit characteristics of the first and second circuit sections each other. Therefore, the sensor device can equally process the first electric charge and the second electric charge and can more accurately detect a received external force.

In the aspect of the invention, it is preferable that the first piezoelectric element and the second piezoelectric element respectively include quartz.

With this configuration, the configuration of the first and second piezoelectric elements is simplified. The force detecting section has excellent characteristics such as high sensitivity, a wide dynamic range, and high rigidity.

Another aspect of the invention is directed to a force detecting device including: a first base section; a second base section; and the sensor device according to the aspect of the invention provided between the first base section and the second base section.

With such a force detecting device, since the force detecting device includes the sensor device according to the aspect of the invention, it is possible to more accurately detect external force.

Still another aspect of the invention is directed to a robot including: a base; an arm connected to the base; and a force detecting device according to the aspect of the invention.

With such a robot, since the robot includes the force detecting device according to the aspect of the invention, it is possible to execute more precise work.

BRIEF DESCRIPTION OF THE DRAWINGS

The invention will be described with reference to the accompanying drawings, wherein like numbers reference like elements.

FIG. 5 is a side view showing a manufacturing method for the sensor device shown in FIG. 1.

FIG. 7 is a perspective view of the force detection element shown in FIG. 6.

FIG. 17 is a sectional view of a sensor device disposed in the force detecting device.

DESCRIPTION OF EXEMPLARY EMBODIMENTS

Preferred embodiments of the invention with reference to a sensor device, a force detecting device and a robot are explained in detail below based on the accompanying drawings.

First Embodiment

A sensor device according to a first embodiment of the invention is explained.

Figure 1:
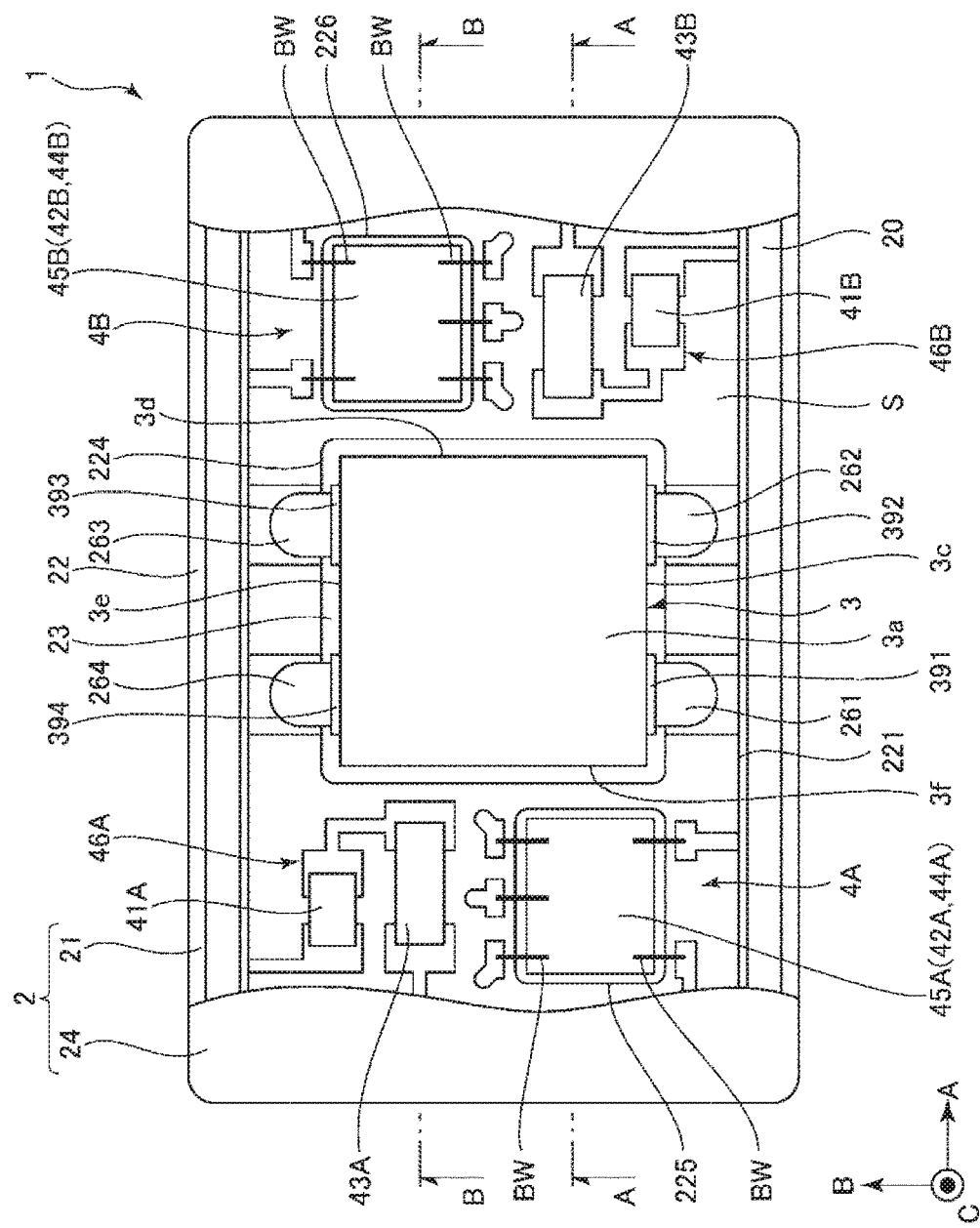
FIG. 1 is a plan view of a sensor device according to a first embodiment of the invention.
Figure 2:
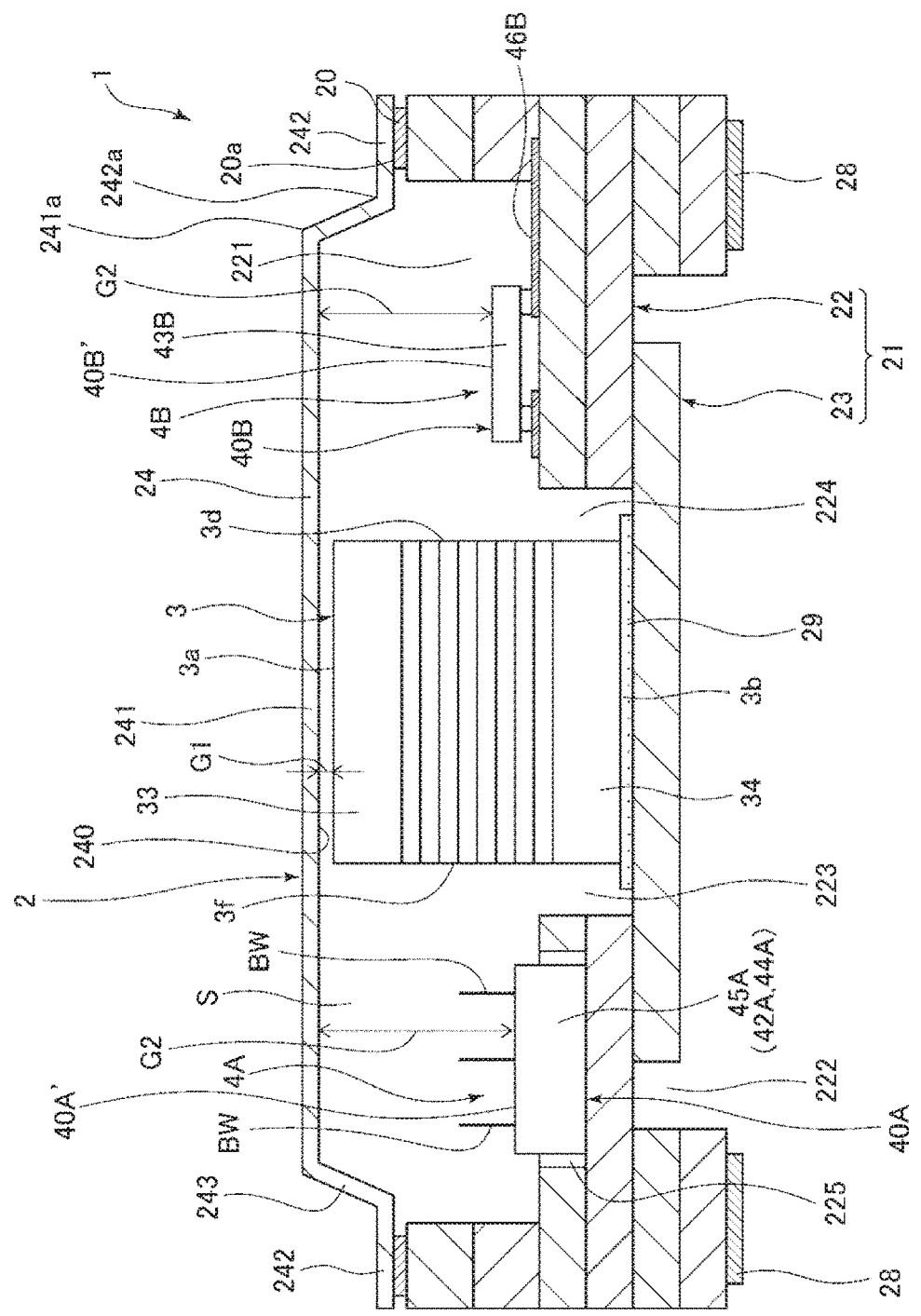
FIG. 2 is an A-A line sectional view in FIG. 1.
Figure 3:
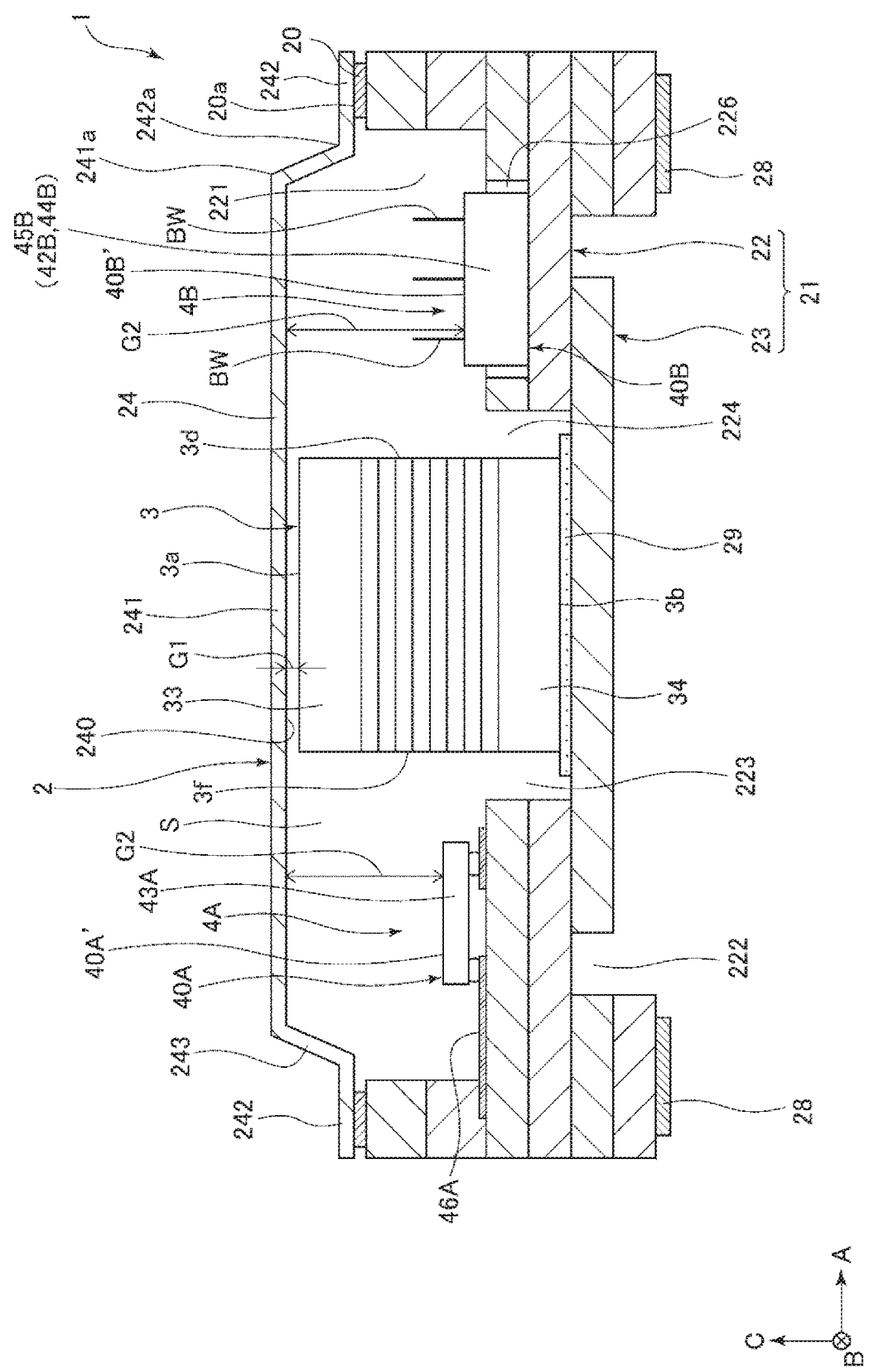
FIG. 3 is a B-B line sectional view in FIG. 1.
Figure 4:
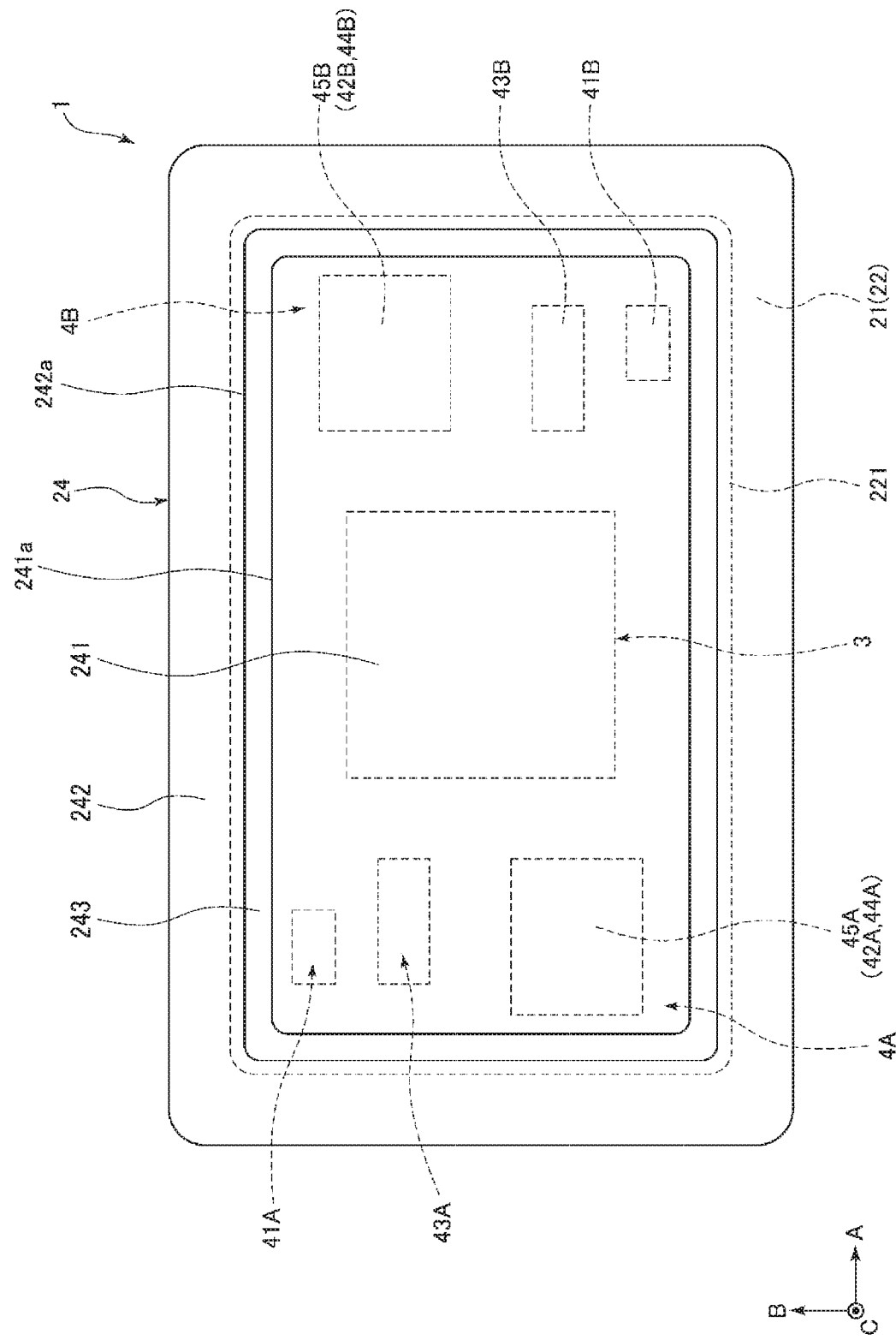
FIG. 4 is a plan view of the sensor device shown in FIG. 1.
Figure 6:
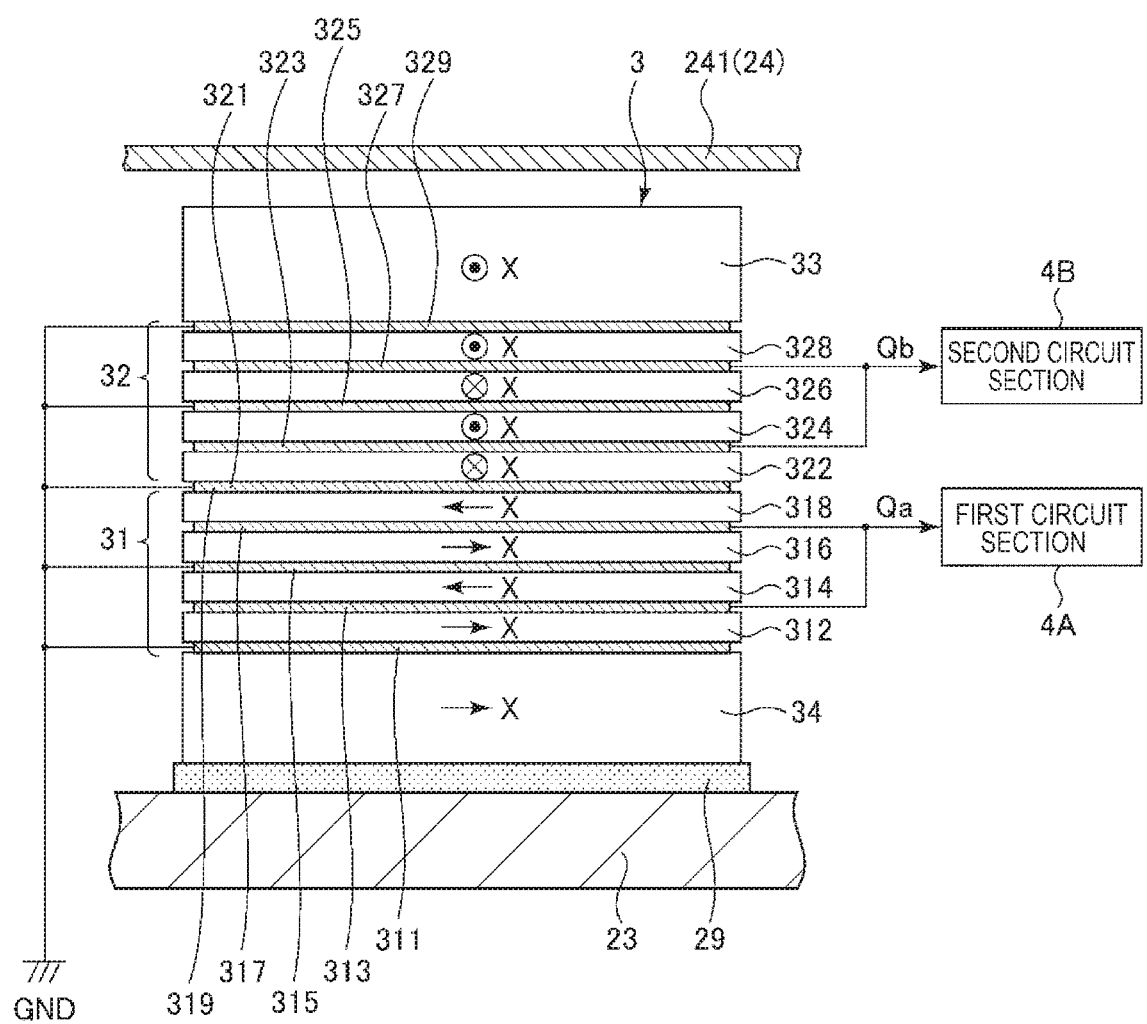
FIG. 6 is a sectional view of a force detection element included in the sensor device shown in FIG. 1.
Figure 8:
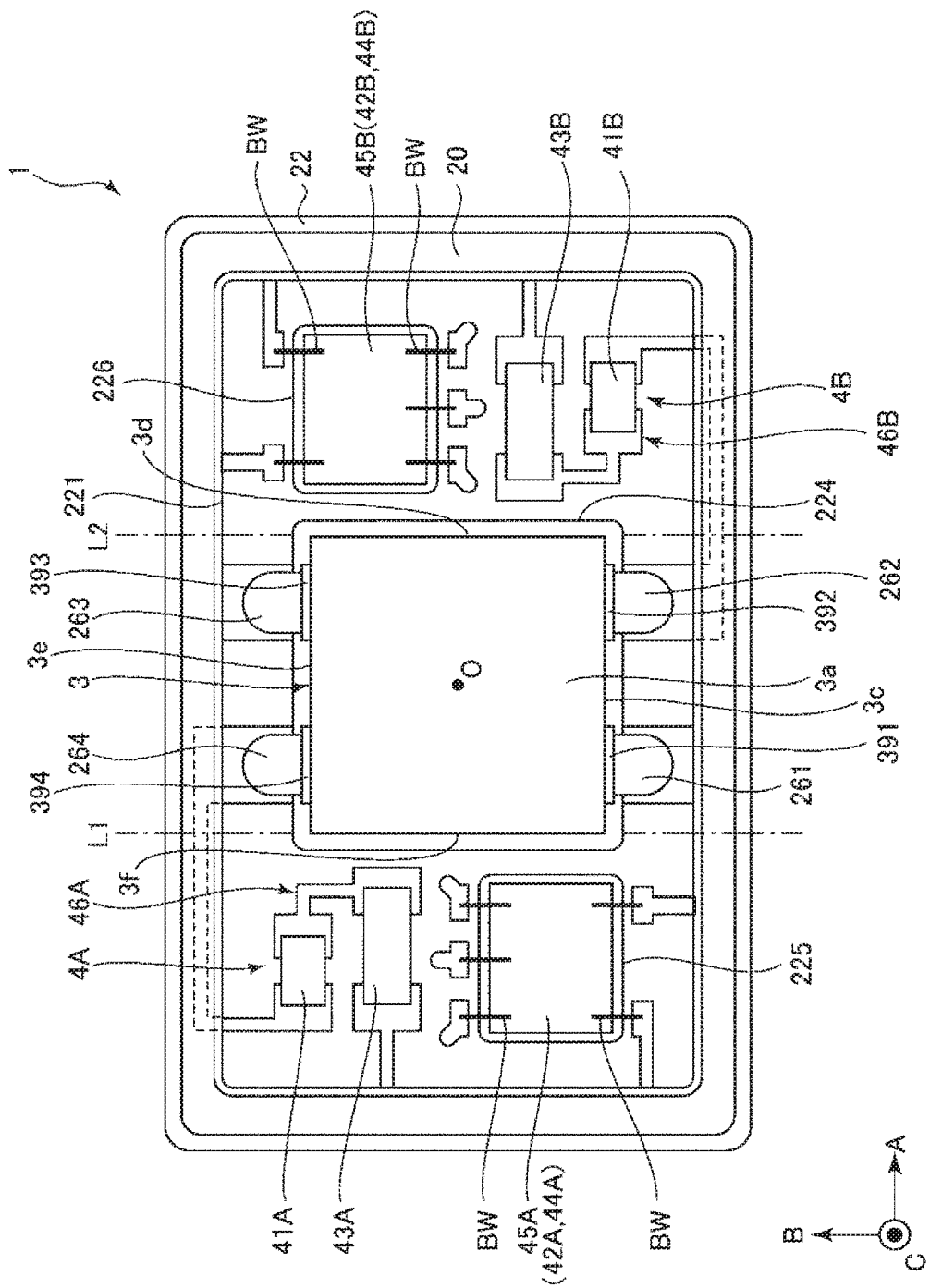
FIG. 8 is a plan view of the sensor device shown in FIG. 1.
Figure 9:
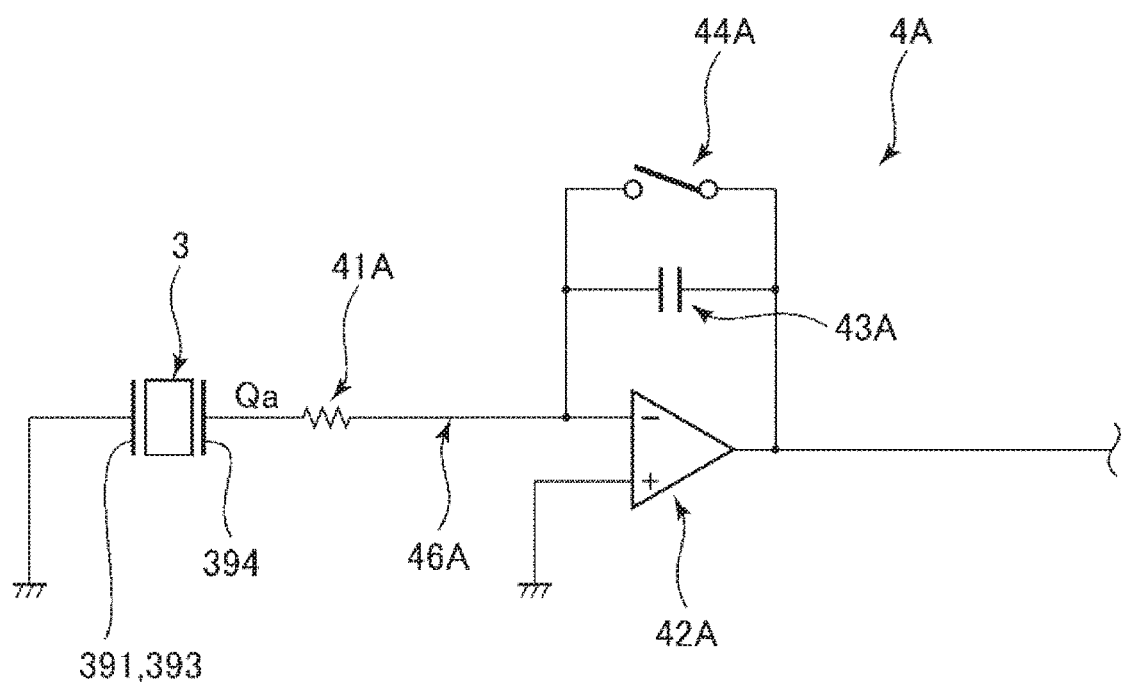
FIG. 9 is a circuit diagram of a first circuit section included in the sensor device shown in FIG. 1.
Figure 10:
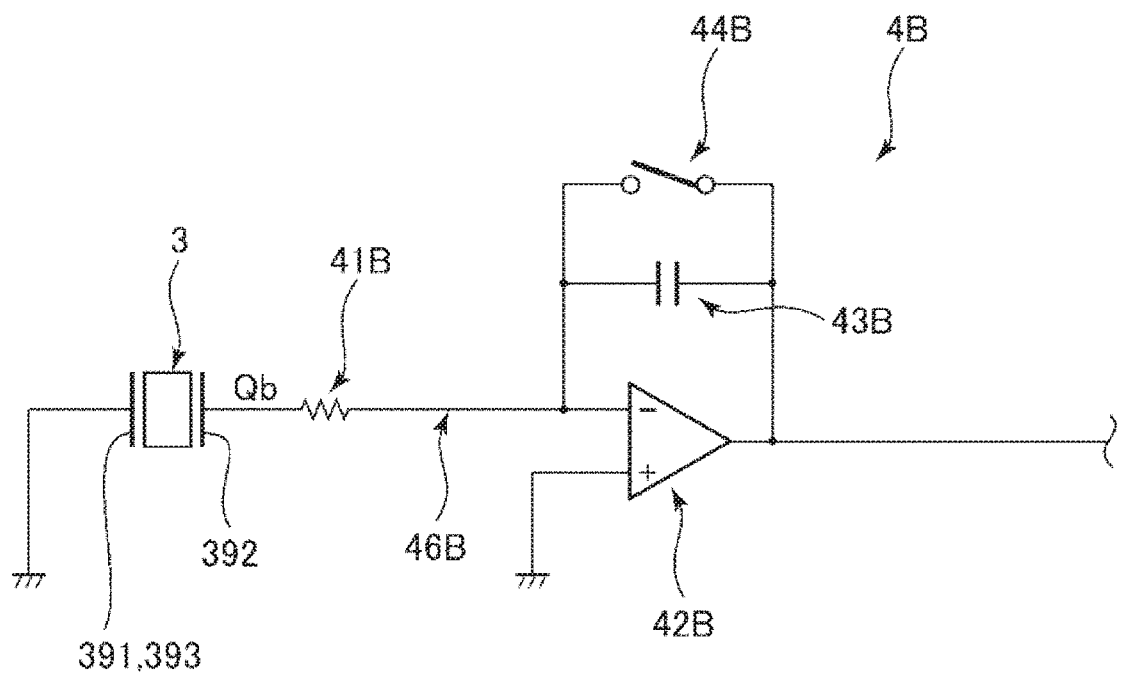
FIG. 10 is a circuit diagram of a second circuit section included in the sensor device shown in FIG. 1.
Figure 11:
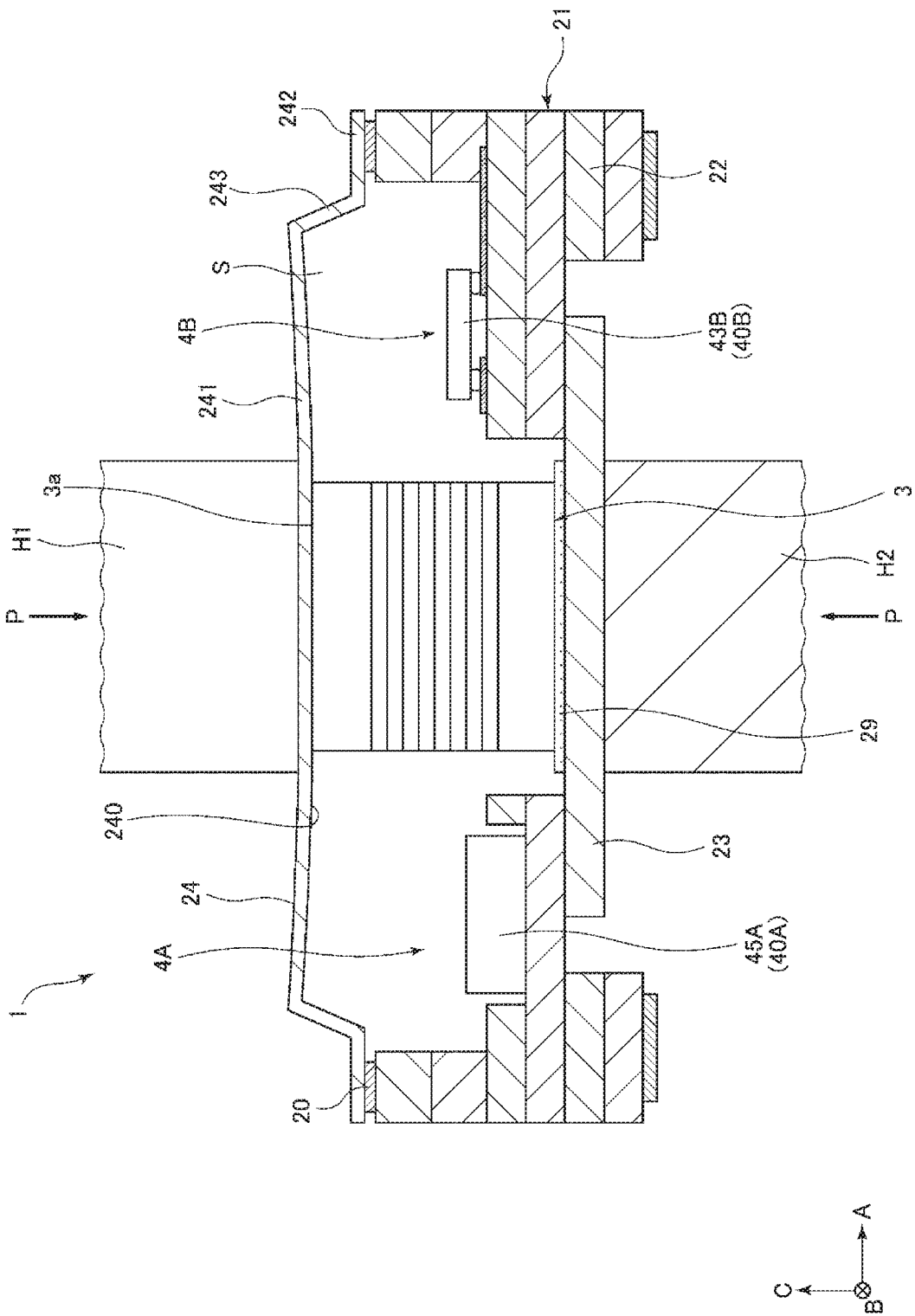
FIG. 11 is a sectional view showing a state of use of the sensor device shown in FIG. 1.

FIG. 1 is a plan view of the sensor device according to the first embodiment of the invention. FIG. 2 is an A-A line sectional view in FIG. 1. FIG. 3 is a B-B line sectional view in FIG. 1. FIG. 4 is a plan view of the sensor device shown in FIG. 1. FIG. 5 is a side view showing a manufacturing method for the sensor device shown in FIG. 1. FIG. 6 is a sectional view of a force detection element included in the sensor device shown in FIG. 1. FIG. 7 is a perspective view of the force detection element shown in FIG. 6. FIG. 8 is a plan view of the sensor device shown in FIG. 1. FIG. 9 is a circuit diagram of a first circuit section included in the sensor device shown in FIG. 1. FIG. 10 is a circuit diagram of a second circuit section included in the sensor device shown in FIG. 1. FIG. 11 is a sectional view showing a state of use of the sensor device shown in FIG. 1.

In the following explanation, for convenience of explanation, three axes orthogonal to one another are represented as an A axis, a B axis, and a C axis. The distal end sides of arrows indicating the axes are represented as a "plus side" and the proximal end sides of the arrows are represented as a "minus side". A direction parallel to the A axis is referred to as "A-axis direction (first direction)", a direction parallel to the B axis is referred to as "B-axis direction (second direction)", and a direction parallel to the C axis is referred to as "C-axis direction". A C-axis direction plus side is referred to as "upper" as well and a C-axis direction minus side is referred to as "lower" as well. A view from the C-axis direction (a plan view of a base body 21) is referred to as "plan view" as well.

A sensor device 1 shown in FIG. 1 includes a package 2 and a force detection element 3 (a force detecting section) and a circuit section 4 housed in the package 2. The circuit section 4 includes a first circuit section 4A and a second circuit section 4B. Such a sensor device 1 is used in a state in which the sensor device 1 is sandwiched from the C-axis direction and the force detection element 3 is preloaded (see FIG. 11). An external force (a shearing force in the A-axis direction and a shearing force in the B-axis direction) applied to the sensor device 1 is transmitted to the force detection element 3 via the package 2. A signal (an electric charge) based on the received external force is output from the force detection element 3. The output signal is processed by the circuit section 4 (the first circuit section 4A and the second circuit section 4B).

In the plan view, the package 2 is formed in a substantially rectangular shape having the A-axis direction as a major axis and having the B-axis direction as a minor axis. The package 2 includes a base body 21 and a lid body 24 joined to the base body 21. A hermetical housing space S is formed on the inner side of the package 2. The force detection element 3, the first circuit section 4A, and the second circuit section 4B are respectively housed in the housing space S. By housing the force detection element 3, the first circuit section 4A, and the second circuit section 4B in the package 2 in this way, these sections can be protected (dustproofed and waterproofed) from the outside world. In particular, by protecting the first and second circuit sections 4A and 4B from moisture (humidity), it is possible to prevent deterioration and fluctuation of characteristics of the first and second circuit sections 4A and 4B due to moisture.

An atmosphere in the housing space S is not particularly limited but is desirably a vacuum state or a state (a decompressed state) close to the vacuum state. Specifically, the housing space S desirably has pressure of 0.01 Pa or more and 1000 Pa or less. Consequently, it is possible to effectively prevent deterioration and fluctuation in the characteristics of the first and second circuit sections 4A and 4B. However, besides the vacuum state, the housing space S may be replaced with an inert gas such as nitrogen, argon, or helium. Consequently, as in the decompressed state, it is possible to effectively prevent deterioration and fluctuation in the characteristics of the first and second circuit sections 4A and 4B.

As shown in FIGS. 2 and 3, the base body 21 includes a base section 22 and a bottom member 23. The base section 22 includes a recessed section (a recess) 221 opened to an upper surface, a recessed section 222 opened to a lower surface, and a through-hole 223 configured to pierce through the centers of the bottom surfaces of the recessed sections 221 and 222. The bottom member 23 is formed in a plate shape and is joined to the bottom surface of the recessed section 222 to close a lower side opening of the through-hole 223. Therefore, a recessed section 224 opened in the center of the bottom surface of the recessed section 221 is formed by the through-hole 223 and the bottom member 23. The force detection element 3 is disposed to be inserted into the recessed section 224. A lower surface 3b of the force detection element 3 is joined to the upper surface of the bottom member 23 via an adhesive 29.

As shown in FIG. 2, the base section 22 includes a recessed section 225 located on an A-axis direction minus side of the recessed section 224 and opened on the bottom surface of the recessed section 221. A circuit element 45A included in the first circuit section 4A is disposed in the recessed section 225. As shown in FIG. 3, the base section includes a recessed section 226 located on an A-axis direction plus side of the recessed section 224 and opened on the bottom surface of the recessed section 221. A circuit element 45B included in the second circuit section 4B is disposed in the recessed section 226. As explained below, the circuit elements 45A and 45B are high (thick) compared with other circuit elements included in the first and second circuit sections 4A and 4B. Therefore, by forming recessed sections 225 and 226 in the base body 21 and disposing the circuit elements 45A and 45B in the recessed sections 225 and 226, it is possible to achieve a reduction in the height of the package 2.

As shown in FIG. 1, in the base section 22, a wire 46A included in the first circuit section 4A and a wire 46B included in the second circuit section 4B are provided. At least parts of the respective wires 46A and 46B are disposed on the bottom surface of the recessed section 221. As shown in FIGS. 2 and 3, a plurality of external terminals 28 exposed to the outside of the package 2 and electrically connected to the first circuit section 4A and the second circuit section 4B are provided on the bottom surface of the base section 22.

A constituent material of the base section 22 is desirably a material having insulation. The constituent material desirably includes, as main components, oxide-based ceramic such as alumina and zirconia, carbide-based ceramics such as silicon carbide, and nitride-based ceramics such as silicon nitride. Consequently, the base section 22 has proper rigidity and is excellent in insulation. Therefore, damage due to deformation of the package 2 less easily occurs. It is possible to more surely protect the force detection element 3 and the first and second circuit sections 4A and 4B housed on the inside of the package 2.

A constituent material of the bottom member 23 is not particularly limited. Examples of the constituent material include various metal materials such as stainless steel, Kovar, copper, iron, carbon steel, and titanium. In particular, the constituent material is desirably Kovar. Consequently, the bottom member 23 has relatively high rigidity and is properly elastically deformed when stress is applied thereto. Therefore, it is possible to accurately transmit an external force to the force detection element 3 via the bottom member 23 and reduce likelihood of breakage of the bottom member 23 by the external force. Kovar has a coefficient of thermal expansion relatively close to a coefficient of thermal expansion of ceramics, which is the constituent material of the base section 22. Therefore, thermal stress (a bend due to a difference between the coefficients of thermal expansion of the base section 22 and the bottom member 23) less easily occurs in the base body 21. It is possible to effectively prevent output drift due to the thermal stress.

The lid body 24 is formed in a plate shape and is joined to the upper surface of the base section 22 via a seal member 20 (a joining member) to close an opening formed on the C-axis direction plus side of the recessed section 221. The seal member 20 is not particularly limited if the seal member 20 can join the base body 21 and the lid body 24. The seal member 20 can be formed of, for example, gold, silver, titanium, aluminum, copper, iron, or an alloy containing these kinds of metal.

As shown in FIGS. 2, 3, and 4, the lid body 24 includes a center section (a center area) 241, an outer edge section (an outer edge area) 242 surrounding the center section 241 and formed in a frame shape along an outer edge of the center section 241, and a connecting section (a connecting area) 243 located between the center section 241 and the outer edge section 242 and connecting the center section 241 and the outer edge section 242. Such a lid body 24 is joined to the upper surface of the base section 22 via the seal member 20 at the outer edge section 242. The center section 241 is located to shift to the opposite side of the bottom member 23 (the C-axis direction plus side) with respect to the outer edge section 242. In the plan view, an outer edge 241a of the center section 241 is located further on the inner side than an inner edge 242a of the outer edge section 242. The connecting section 243 is inclined to connect the inner edge 242a of the outer edge section 242 and the outer edge 241a of the center section 241 and is formed in a taper shape reduced in width toward the C-axis direction plus side.

By forming the lid body 24 in a hat shape in this way, the outer circumferential portion of the package 2 is reduced in height. Therefore, it is possible to achieve a reduction in the size of the package 2. Since boundary portions of the center section 241, the connecting section 243, and the outer edge section 242 bend, it is possible to reduce and absorb stress applied to the lid body 24. Therefore, it is possible to prevent peeling of the lid body 24. In particular, as shown in FIG. 5, the lid body 24 is joined to the upper surface of the base section 22 using seam welding. However, stress caused by pressing a roller electrode RE against the outer edge section 242 and thermal stress caused by heating the lid body 24 with the roller electrode RE can be effectively reduced and absorbed by the deformation explained above. Therefore, it is possible to effectively prevent breakage of the lid body 24 and more surely hermetically seal the housing space S. In particular, since the connecting section 243 is inclined in a taper shape, the effect explained above is more conspicuous. However, the shape of the lid body 24 is not particularly limited. For example, the connecting section 243 may be formed in a straight shape having fixed width along the C-axis direction. The lid body 24 may be formed in a flat shape. Contrary to this embodiment, the center section 241 may be recessed.

A constituent material of such a lid body 24 is not particularly limited. Like the constituent material of the bottom member 23 explained above, examples of the constituent material include various metal materials such as stainless steel, Kovar, coper, iron, carbon steel, and titanium. In particular, the constituent material is desirably Kovar. Consequently, like the bottom member 23, it is possible to accurately transmit an external force to the force detection element 3 and reduce breakage of the lid body 24 by the external force. The constituent material of the lid body 24 may be the same as or may be different from the constituent material of the bottom member 23. However, the constituent materials are desirably the same. Consequently, it is possible to more accurately transmit an external force applied to the package 2 to the force detection element 3.

The force detection element 3 has a function of outputting an electric charge Qa (a first electric charge) corresponding to a component in the A-axis direction of an external force applied to the force detection element 3 and an electric charge Qb (a second electric charge) corresponding to a component in the B-axis direction of the external force applied to the force detection element 3. The force detection element 3 includes, as shown in FIG. 6, a piezoelectric element 31 (a first piezoelectric element) configured to output the electric charge Qa according to an external force (a shearing force) in the A-axis direction, a piezoelectric element 32 (a second piezoelectric element) configured to output the electric charge Qb according to an external force (a shearing force) in the B-axis direction, and a pair of supporting substrates 33 and 34.

The piezoelectric element 31 has a configuration in which a ground electrode layer 311, a piezoelectric layer 312, an output electrode layer 313, a piezoelectric layer 314, a ground electrode layer 315, a piezoelectric layer 316, an output electrode layer 317, a piezoelectric layer 318, and a ground electrode layer 319 are stacked in order from the lower side (the C-axis direction minus side). The piezoelectric element 32 is stacked on the piezoelectric element 31. The piezoelectric element 32 has a configuration in which a ground electrode layer 321, a piezoelectric layer 322, an output electrode layer 323, a piezoelectric layer 324, a ground electrode layer 325, a piezoelectric layer 326, an output electrode layer 327, a piezoelectric layer 328, and a ground electrode layer 329 are stacked in order from the lower side (the C-axis direction minus side). In this embodiment, the ground electrode layers 319 and 321 are integrated (made common). However, the ground electrode layers 319 and 321 are not limited to this. The order of the stacking in the C-axis direction of the piezoelectric elements 31 and 32 may be opposite. The piezoelectric elements 31 and 32 may be not stacked and may be laterally disposed side by side.

The piezoelectric layers 312, 314, 316, 318, 322, 324, 326, and 328 are respectively formed of quartz. Consequently, the force detection element 3 has excellent characteristics such as high sensitivity, a wide dynamic range, and high rigidity. In the piezoelectric layers 312 and 316, the X axis (an electric axis), which is a crystal axis of the quartz, faces the right side in FIG. 6 (the A-axis direction plus side). In the piezoelectric layers 314 and 318, the X axis of the quartz faces the left side in FIG. 6 (the A-axis direction minus side). In the piezoelectric layers 322 and 326, the X axis of the quartz faces the paper surface depth side in FIG. 6 (the B-axis direction plus side). In the piezoelectric layers 324 and 328, the X axis of the quartz faces the paper surface near side in FIG. 6 (the B-axis direction minus side). The piezoelectric layers 312, 314, 316, 318, 322, 324, 326, and 328 are respectively formed by Y-cut quartz plates (quartz plates having the Y axis (a machine axis) of the quartz as the thickness direction).

However, the piezoelectric layers 312, 314, 316, 318, 322, 324, 326, and 328 may be formed of a piezoelectric material other than the quartz. Examples of the piezoelectric material other than the quartz include topaz, barium titanate, lead titanate, titanate zirconate (PZT: $Pb(Zr,Ti)O_3$), lithium niobate, and lithium tantalate.

The ground electrode layers 311, 315, 319 (321), 325, and 329 are respectively electrically connected to reference potential (e.g., ground potential GND). The output electrode layers 313 and 317 are respectively electrically connected to the first circuit section 4A. The output electrode layers 323 and 327 are respectively electrically connected to the second circuit section 4B. A constituent material of the ground electrode layers 311, 315, 319 (321), 325, and 329 and the output electrode layers 313, 317, 323, and 327 is not particularly limited. Examples of the constituent material include nickel, gold, titanium, aluminum, copper, iron, chrome, or an alloy containing these kinds of metal. One of these kinds of metal can be used or two or more of these kinds of metal can be used in combination (e.g., stacked and used).

The pair of supporting substrates 33 and 34 is disposed to vertically sandwich a stacked body of the piezoelectric elements 31 and 32. Specifically, the supporting substrate 33 is disposed on the upper surface of the stacked body of the piezoelectric elements 31 and 32 and the supporting substrate 34 is disposed on the lower surface of the stacked body. Consequently, the ground electrode layers 311 and 329 can be covered by the supporting substrates 33 and 34. The ground electrode layers 311 and 319 can be protected. It is possible to prevent the ground electrode layers 311 and 329 from coming into contact with the package 2 to cause unintended conduction.

The supporting substrates 33 and 34 are formed of quartz. The supporting substrate 33 has the same configuration as the configuration of the piezoelectric layer 328 adjacent thereto. That is, like the piezoelectric layer 328, the supporting substrate 33 is formed by a Y-cut quartz plate. The X axis of the quartz faces the paper surface near side in FIG. 6 (the B-axis direction minus side). Similarly, the supporting substrate 34 has the same configuration as the configuration of the piezoelectric layer 312 adjacent thereto. That is, like the piezoelectric body layer 312, the supporting substrate 34 is formed by a Y-cut quartz plate. The X axis of the quartz faces the right side in FIG. 6 (the A-axis direction plus side). In this way, the supporting substrate 33 is configured the same as the piezoelectric layer 328 adjacent thereto and the supporting substrate 34 is configured the same as the piezoelectric layer 312 adjacent thereto. Consequently coefficients of thermal expansion of these members can be obtained. It is possible to effectively reduce output drift due to thermal expansion.

A crystal axis of the supporting substrate 33 may not coincide with a crystal axis of the piezoelectric layer 328. A crystal axis of the supporting substrate 34 may not coincide with a crystal axis of the piezoelectric layer 312. The supporting substrates 33 and 34 may be respectively formed of a piezoelectric body other than the quartz or may be formed of a material not having conductivity other than the piezoelectric body. The supporting substrates 33 and 34 may be omitted.

As shown in FIG. 7, the overall shape of the force detection element 3 is a rectangular parallelepiped. That is, the force detection element 3 includes an upper surface 3a, which is the upper surface of the supporting substrate 33, a lower surface 3b, which is the lower surface of the supporting substrate 34, and four side surfaces 3c, 3d, 3e, and 3f that connect the upper surface 3a and the lower surface 3b. On the side surface 3c facing the B-axis direction minus side, a connection electrode 391 electrically connected to the ground electrode layers 311, 315, 319 (321), 325, and 329 and a connection electrode 392 electrically connected to the output electrode layers 323 and 327 are provided to be spaced apart in the width direction (the A-axis direction). In this embodiment, the connection electrode 391 is located on the A-axis direction minus side. The connection electrode 392 is located on the X-axis direction plus side.

On the side surface 3e opposed to the side surface 3c and facing the B-axis direction plus side, a connection electrode 393 electrically connected to the ground electrode layers 311, 315, 319 (321), 325, and 329 and a connection electrode 394 electrically connected to the output electrode layers 313 and 317 are provided to be separated in the width direction (the A-axis direction). In this embodiment, the connection electrode 394 is located on the A-axis direction minus side. The connection electrode 393 is located on the A-axis direction plus side.

By providing the connection electrodes 391, 392, 393, and 394 on the side surfaces 3c and 3e in this way, it is possible to easily perform electric connection of the force detection element 3 and the first and second circuit sections 4A and 4B.

However, the disposition of the connection electrodes 391, 392, 393, and 394 is not particularly limited. For example, the connection electrodes 391, 392, 393, and 394 may be separately disposed on different side surfaces of the force detection element 3 or may be collectively disposed on one side surface of the force detection element 3. The connection electrodes 391, 392, 393, and 394 may be disposed on the upper surface 3a and the lower surface 3b of the force detection element 3. The shape of the force detection element 3 is not particularly limited. For example, in the plan view, the shape of the force detection element 3 may be any shape such as a circle, an ellipse, a triangle, quadrangles other than a square (a rectangle, a trapezoid, a parallelogram, etc.), polygons other than a pentagon, and irregular shapes.

The force detection element 3 is explained above. As shown in FIGS. 2 and 3, the lower surface 3b of the force detection element 3 is joined to the bottom surface of the recessed section 224 of the package 2 (the upper surface of the bottom member 23) via an insulative adhesive 29. The adhesive 29 is not particularly limited. For example, acrylic resin, phenolic resin, silicone resin, and epoxy resin can be used.

As shown in FIGS. 2 and 3, in a natural state, the upper surface 3a of the force detection element 3 is disposed to be opposed to the center section 241 of the lid body 24 via an air gap. Consequently, it is possible to effectively prevent a situation in which, because the force detection element 3 is sandwiched by the bottom member 23 and the lid body 24, unintended stress (stress other than a detection target) is applied to the force detection element 3 and drift of an output occurs. However, not only this, but the upper surface 3a of the force detection element 3 may be in contact with the center section 241 of the lid body 24. An adhesive (e.g., the same adhesive as the adhesive 29) may be provided between the upper surface 3a of the force detection element 3 and the center section 241 of the lid body 24. The force detection element 3 and the lid body 24 may be joined via the adhesive.

The first circuit section 4A and the second circuit section 4B are respectively housed in the housing space S of the package 2. As shown in FIG. 8, in the plan view, the first circuit section 4A is located on one side (the A-axis direction minus side) with respect to the force detection element 3 and the second circuit section 4B is located on the other side (the A-axis direction plus side) with respect to the force detection element 3. The first circuit section 4A is a circuit that processes the electric charge Qa output from the force detection element 3. The second circuit section 4B is a circuit that processes the electric charge Qb output from the force detection element 3. By providing the first circuit section 4A and the second circuit section 4B on the opposite sides with respect to the force detection element 3 in this way, the first circuit section 4A and the second circuit section 4B can be disposed to be separated as much as possible. Therefore, interference between the first circuit section 4A and the second circuit section 4B is reduced. It is possible to effectively prevent noise from the second circuit section 4B from being superimposed on the electric charge Qa and, conversely, noise from the first circuit section 4A from being superimposed on the electric charge Qb. Therefore, noise resistance is improved. The electric charge Qa can be accurately processed by the first circuit section 4A. The electric charge Qb can be accurately processed by the second circuit section 4B.

The first circuit section 4A is a circuit (a charge/voltage conversion circuit) that converts the electric charge Qa into a voltage Va. As shown in FIG. 9, the first circuit section 4A includes a resistor 41A to which the electric charge Qa is input, a capacitor 43A (a charge accumulating section) configured to charge the electric charge Qa, an operational amplifier 42A (an amplifier) configured to amplify a voltage by the electric charge Qa, a switching element 44A, and the wire 46A.

Among the circuit elements, the resistor 41A and the capacitor 43A are respectively provided on the bottom surface of the recessed section 221. The operational amplifier 42A and the switching element 44A are integrated as the circuit element 45A and then provided on the bottom surface of the recessed section 225. The resistor 41A, the capacitor 43A, and the circuit element 45A are electrically connected via the wire 46A. The wire 46A is electrically connected to the connection electrodes 391 and 394 of the force detection element 3 via conductive connection members 261 and 264 (e.g., various kinds of metal paste such as Ag paste, Cu paste, and Au paste). Consequently, a circuit shown in FIG. 9 is realized. In the following explanation, for convenience of explanation, the resistor 41A, the capacitor 43A, and the circuit element 45A are respectively referred to as "electronic components 40A" as well.

The resistor 41A and the capacitor 43A are electrically connected to the wire 46A by flip-chip mounting using a conducive bump such as a gold (Au) bump. The circuit element 45A is electrically connected to the wire 46A via a bonding wire BW. However, an electric connection method for connecting the resistor 41A, the capacitor 43A, and the circuit element 45A to the wire 46A is not particularly limited. The operational amplifier 42A and the switching element 44A may be formed as separate bodies.

The second circuit section 4B is a circuit (a charge/voltage conversion circuit) that converts the electric charge Qb into a voltage Vb. The second circuit section 4B has the same configuration as the configuration of the first circuit section 4A explained above. That is, the second circuit section 4B includes, as shown in FIG. 10, a resistor 41B to which the electric charge Qb is input, a capacitor 43B (a charge accumulating section) configured to charge the electric charge Qb, an operational amplifier 42B (an amplifier) configured to amplify a voltage by the electric charge Qb, a switching element 44B, and the wire 46B.

Among these circuit elements, the resistor 41B and the capacitor 43B are respectively provided on the bottom surface of the recessed section 221. The operational amplifier 42B and the switching element 44B are integrated as the circuit element 45B and then provided on the bottom surface of the recessed section 226. The resistor 41B, the capacitor 43B, and the circuit element 45B are electrically connected via the wire 46B. The wire 46B is electrically connected to the connection electrodes 392 and 393 of the force detection element 3 via conductive connection members 262 and 263 (e.g., various kinds of metal paste such as Ag paste, Cu paste, and Au paste). Consequently, a circuit shown in FIG. 10 is realized.

In the following explanation, for convenience of explanation, the resistor 41B, the capacitor 43B, and the circuit element 45B are respectively referred to as "electronic components 40B" as well.

The resistor 41B and the capacitor 43B are electrically connected to the wire 46B by flip-chip mounting using a conductive bump such as a gold (Au) bump. The circuit element 45B is electrically connected to the wire 46B via the bonding wire BW. However, an electric connection method for connecting the resistor 41B, the capacitor 43B, and the circuit element 45B to the wire 46B is not particularly limited. The operational amplifier 42B and the switching element 44B may be formed as separate bodies.

In the first circuit section 4A, the circuit element 45A is thicker than the other electronic components 40A (i.e., the resistor 41A and the capacitor 43A). Therefore, in this embodiment, the recessed section 225 is formed on the bottom surface of the recessed section 221. The circuit element 45A is provided on the bottom surface of the recessed section 225. Consequently, the height of the circuit element 45A can be reduced. Therefore, it is possible to prevent an increase in the height of the package 2. It is easy to secure a disposition space of the boding wire BW on the circuit element 45A.

Similarly, in the second circuit section 4B, the circuit element 45B is thicker than the other electronic components 40B (i.e., the resistor 41B and the capacitor 43B). Therefore, in this embodiment, the recessed section 226 is formed on the bottom surface of the recessed section 221. The circuit element 45B is provided on the bottom surface of the recessed section 226. Consequently, the height of the circuit element 45B can be reduced. Therefore, it is possible to prevent an increase in the height of the package 2. It is easy to secure a disposition space of the bonding wire BW on the circuit element 45B. However, the recessed sections 225 and 226 may be omitted. The circuit elements 45A and 45B may be disposed on the bottom surface of the recessed section 221.

As shown in FIG. 4, in the first circuit section 4A, in the plan view, all of the resistor 41A, the capacitor 43A, and the circuit element 45A are disposed to overlap the center section 241 of the lid body 24. As explained above, the center section 241 of the lid body 24 is offset further to the upper side than the other portions (the outer edge section 242). Therefore, it is possible to effectively prevent contact of the resistor 41A, the capacitor 43A, and the circuit element 45A with the lid body 24. It is possible to reduce breakage and malfunction of the first circuit section 4A. However, not only this but, for example, at least one of the resistor 41A, the capacitor 43A, and the circuit element 45A may be disposed in a position not overlapping the center section 241 (i.e., on the outer side of the center section 241, for example, a position overlapping the outer edge section 242) in plan view.

Similarly, in the second circuit section 4B, in plan view, all of the resistor 41B, the capacitor 43B, and the circuit element 45B are disposed to overlap the center section 241 of the lid body 24. Therefore, it is possible to effectively prevent contact of the resistor 41B, the capacitor 43B and the circuit element 45B with the lid body 24. It is possible to prevent breakage and malfunction of the second circuit section 4B. However, not only this, but, for example, at least one of the resistor 41B, the capacitor 43B, and the circuit element 45B may be disposed in a position not overlapping the center section 241 (i.e., on the outer side of the center section 241, for example, a position overlapping the outer edge section 242) in the plan view.

By housing the first circuit section 4A and the second circuit section 4B in the package 2, the first and second circuit sections 4A and 4B can be protected (dustproofed and waterproofed). In particular, it is possible to effectively prevent deterioration in characteristics of the first and second circuit sections 4A and 4B by protecting the first and second circuit sections 4A and 4B from moisture (humidity). For example, the capacitors 43A and 43B are portions that charge the electric charges Qa and Qb from the power detection element 3. However, the capacitors 43A and 43B are easily affected by a leak current due to humidity. In the operational amplifiers 42A and 42B, an offset voltage on an input side fluctuates because of humidity. In this way, the first and second circuit sections 4A and 4B include the electronic components 40A and 40B easily affected by moisture (humidity). Therefore, it is possible to effectively prevent deterioration and fluctuation in circuit characteristics of the first and second circuit sections 4A and 4B by housing the first and second circuit sections 4A and 4B in the package 2 and waterproofing the first and second circuit sections 4A and 4B. It is possible to more accurately convert the electric charges Qa and Qb into voltages Va and Vb. Therefore, with the sensor device 1, it is possible to more accurately detect a received external force.

By housing the first and second circuit sections 4A and 4B in the package 2, it is possible to reduce the lengths of the wires 46A and 46B compared with, for example, when the first and second circuit sections 4A and 4B are disposed on the outer side of the package 2. Therefore, noise resistance of the first and second circuit sections 4A and 4B is improved.

As shown in FIGS. 2 and 3, when a separation distance between the force detection element 3 and the lid body 24 is represented as G1 and a separation distance between the electronic components 40A and 40B included in the first and second circuit sections 4A and 4B and the lid body 24 is represented as G2, the separation distances G1 and G2 satisfy a relation of G1<G2. That is, the separation distance G2 is larger than the separation distance G1. The separation distance G1 is a minimum separation distance in the C-axis direction between the force detection element 3 and the lid body 24. In this embodiment, the separation distance G1 is a separation distance between the upper surface 3a of the force detection element 3 and an inner surface 240 of the lid body 24. The separation distance G2 is a minimum separation distance in the C-axis direction between the electronic components 40A and 40B and the lid body 24. In this embodiment, the separation distance G2 is a separation distance between upper surfaces 40A' and 40B' of the electronic components 40A and 40B and the inner surface 240 of the lid body 24. The separation distance G2 may be different for each of the electronic components 40A and 40B or may be the same.

When such a relation is satisfied, it is possible to exert effects explained below. For example, as explained in a fourth embodiment below, as shown in FIG. 11, the sensor device 1 is sandwiched in the C-axis direction by a pair of pressing members H1 and H2 and used in a state in which the force detection element 3 is preloaded in the C-axis direction (a state in which a compression force indicated by an arrow P is applied to the sensor device 1).

In the state shown in FIG. 11, the lid body 24 is deflectively deformed. The inner surface 240 of the lid body 24 comes into contact with the upper surface 3a of the force detection element 3. When G1<G2 is satisfied, it is possible to effectively prevent interference (contact) of the lid body 24 and the electronic components 40A and 40B in the state shown in FIG. 11. That is, even if the lid body 24 is deflectively deformed to come into contact with the force detection element 3, it is possible to effectively prevent contact with the lid body 24 and the electronic components 40A and 40B. Therefore, it is possible to obtain the sensor device 1 that can preload the force detection element 3 with a desired compression force and exert an excellent force detection characteristic. Since the contact of the lid body 24 and the electronic components 40A and 40B is prevented, it is possible to prevent breakage, peeling, and the like of the electronic components 40A and 40B. Reliability of the sensor device 1 is improved.

If the relation of G1<G2 is satisfied, the above effects can be exerted. In the relation, it is desirable to satisfy a relation of 5G1<G2, more desirable to satisfy a relation of 10G1<G2, and still more desirable to satisfy a relation of 20G1<G2. By satisfying such relations, it is possible to more conspicuously exert the effects. That is, in the state shown in FIG. 11, it is possible to more effectively prevent interference (contact) between the lid body 24 and the electronic components 40A and 40B. The separation distance G1 is not particularly limited. However, the separation distance G1 can be set to, for example, 1 µm or more and 10 µm or less. Consequently, even if a manufacturing error and the like are considered, it is possible to more surely separate the force detection element 3 and the lid body 24 in the natural state. In the state shown in FIG. 11, it is possible to effectively prevent the lid body 24 from being excessively deflectively deformed and broken.

As explained above, the electronic components 40A and 40B overlap the center section 241 of the lid body 24 in the plan view. Therefore, for example, compared with when the electronic components 40A and 40B overlap the outer edge section 242, the separation distance G2 can be secured long. The separation distance G2 can be secured large with respect to the separation distance G1.

As explained above, the lid body 24 is formed in the hat shape including the taper-like connecting section 243. Therefore, the lid body 24 is easily deflectively deformed. Therefore, in the state shown in FIG. 11, the lid body 24 can be easily deformed. The lid body 24 can be smore surely brought into contact with the force detection element 3. Therefore, the force detection element 3 can be more surely preloaded by the pair of pressing members H1 and H2. Since the lid body 24 is deformed, stress is less easily transmitted to a joining portion of the lid body 24 and the base body 21. For example, it is possible to effectively prevent peeling of the lid body 24 from the base body 21.

As shown in FIGS. 2 and 3, an upper surface 20a (a joining surface with the lid body 24) of the seal member 20 is located between the upper surface 3a (the end on the lid body 24 side) of the force detection element 3 and the upper surfaces 40A' and 40B' (the ends on the lid body side) of the electronic components 40A and 40B in the C-axis direction. By adopting such a configuration, as shown in FIG. 11, deformation of the lid body 24 is restricted by coming into contact with the force detection element 3. It is possible to prevent the lid body 24 from being deflectively deformed further downward than the upper surface 20a. Therefore, it is possible to more surely prevent contact of the lid body 24 and the electronic components 40A and 40B present below the upper surface 20a.

The first and second circuit sections 4A and 4B are symmetrically disposed with respect to the force detection element 3 in the plan view. Specifically, the first circuit section 4A and the second circuit section 4B are disposed to be point-symmetrical (180° rotation-symmetrical) with respect to a center O of the force detection element 3. Consequently, it is possible to substantially equalize circuit characteristics (wiring lengths, influences from the periphery, etc.), that is, charge/voltage conversion characteristics of the first and second circuit sections 4A and 4B. Therefore, it is possible to extract a signal corresponding to an external force (a shearing force) in the A-axis direction and a signal corresponding to an external force (a shearing force) in the B-axis direction in a well-balanced state. It is possible to more accurately detect a received external force.

The first circuit section 4A and the second circuit section 4B being point-symmetrically disposed with respect to the center O means that at least the circuit elements (the resistors 41A and 41B, the capacitors 43A and 43B, and the circuit elements 45A and 45B) are point-symmetrically disposed with respect to the center O and preferably means that the wires 46A and 46B are also point-symmetrically disposed with respect to the center O. The first circuit section 4A and the second circuit section 4B being point-symmetrically disposed with respect to the center O means that, for example, errors that could occur in design or manufacturing are included. The point-symmetry is not always limited to perfect point symmetry. This also means that, in the plan view, besides a symmetrical point of the first circuit section 4A and the second circuit section 4B coinciding with the center O, the symmetrical point deviates from the center O in a range overlapping the force detection element 3 are included.

Since the first circuit section 4A and the second circuit section 4B are point-symmetrical with respect to the center O, accordingly, in the force detection element 3, the connection electrode 394 from which the electric charge Qa is output is disposed on the side surface 3e facing the B-axis direction plus side and the connection electrode 392 from which the electric charge Qb is output is disposed on the side surface 3c facing the B-axis direction minus side. Further, the connection member 264 that connects the first circuit section 4A and the connection electrode 394 is disposed on the B-axis direction plus side with respect to the force detection element 3. The connection member 262 that connects the second circuit section 4B and the connection electrode 392 is disposed on the B-axis direction minus side with respect to the force detection element 3. By adopting such disposition, with relatively simple disposition, it is possible to point-symmetrically dispose the first circuit section 4A and the second circuit section 4B with respect to the center O of the force detection element 3. In particular, in this embodiment, the connection electrode 394 is disposed to deviate to the first circuit section 4A side (the A-axis direction minus side) of the side surface 3e. Therefore, the length of a wire connecting the connection electrode 394 and the resistor 41A can be reduced. Similarly, the connection electrode 392 is disposed to deviate to the second circuit section 4B side (the A-axis direction plus side) of the side surface 3c. Therefore, the length of a wire connecting the connection electrode 392 and the resistor 41B can be reduced.

The sensor device 1 is explained above. Such a sensor device 1 includes, as explained above, the base body including the recessed section 221, the lid body 24 configured to close the opening of the recessed section 221, the force detection element 3 (the force detecting section) disposed in the recessed section 221 and configured to output electric charges according to a received external force, and the electronic components 40A and 40B disposed in the recessed section 221 and electrically connected to the force detection element 3. The separation distance G2 between the electronic components 40A and 40B and the lid body 24 is larger than the separation distance G1 between the force detection element 3 and the lid body 24 (G1<G2). Consequently, as shown in FIG. 11, in a state of use of the sensor device 1, it is possible to effectively prevent interference (contact) between the lid body 24 and the electronic components 40A and 40B. Therefore, it is possible to obtain the sensor device 1 that can preload the force detection element 3 with a desired compression force and exert an excellent force detection characteristic. Since the contact of the lid body 24 and the electronic components 40A and 40B is prevented, it is possible to prevent breakage, peeling, and the like of the electronic components 40A and 40B. Reliability of the sensor device 1 is improved.

As explained above, in the plan view from the thickness direction of the lid body 24, the lid body 24 includes the center section 241, the outer edge section 242 formed in the frame shape surrounding the center section 241 and joined to the base body 21, and the frame-like connecting section 243 located between the center section 241 and the outer edge section 242 and connecting the center section 241 and the outer edge section 242. In the plan view, the force detection element 3 and the electronic components 40A and 40B overlap the center section 241. Therefore, it is possible to secure the separation distance G2 long compared with when the electronic components 40A and 40B overlap the outer edge section 242. It is possible to secure the separation distance G2 larger than the separation distance G1. Therefore, it is possible to more effectively prevent the contact of the lid body 24 and the electronic components 40A and 40B.

As explained above, in the sectional view from the direction orthogonal to the thickness direction of the lid body 24, the connecting section 243 is formed in the taper shape connecting the outer edge 241a of the center section 241 and the inner edge 242a of the outer edge section 242. By forming the lid body 24 in such a shape, the lid body 24 easily bends. Therefore, in the state shown in FIG. 11, the lid body 24 can be easily deformed. It is possible to surely bring the lid body 24 into contact with the force detection element 3. Therefore, the force detection element can be more surely preloaded by the pair of pressing members H1 and H2. Since the lid body 24 is deformed, stress is less easily transmitted to the joining portion of the lid body 24 and the base body 21. For example, it is possible to effectively prevent peeling of the lid body 24 from the base body 21.

As explained above, the sensor device 1 includes the seal member 20 (the joining member) located between the base body 21 and the lid body 24 and configured to join the base body 21 and the lid body 24. The upper surface 20a (the joining surface with the lid body 24) of the seal member 20 is located between the upper surface 3a (the end on the lid body 24 side, in other words, the portion located on the most C-axis direction plus side) of the force detection element 3 and the upper surfaces 40A' and 40B' (the ends on the lid body 24 side, in other words, the portions located on the most C-axis direction plus side) of the electronic components 40A and 40B in the sectional view from the direction orthogonal to the thickness direction of the lid body 24. By adopting such a configuration, as shown in FIG. 11, the lid body 24 is restricted from being deformed by coming into contact with the force detection element 3. It is possible to prevent the lid body 24 from being deflectively deformed further downward than the upper surface 20a. Therefore, it is possible to more surely prevent contact of the lid body 24 and the electronic components 40A and 40B present below the upper surface 20a.

As explained above, the recessed section 221 is closed by the lid body 24. The inside of the recessed section 221 (the housing space S) is desirably in the decompressed state. Consequently, it is possible to effectively prevent deterioration and fluctuation in the characteristics of the first and second circuit sections 4A and 4B. In particular, an air pressure in the recessed section 221 (the housing space S) is desirably 0.01 Pa or more and 1000 Pa or less. Consequently, it is possible to more effectively prevent deterioration and fluctuation in the characteristics of the first and second circuit sections 4A and 4B.

As explained above, an inert gas is desirably filled in the recessed section 221 (the housing space S). Consequently, it is possible to effectively prevent deterioration and fluctuation in the characteristics of the first and second circuit sections 4A and 4B.

As explained above, the sensor device 1 includes the circuit section 4 including the electronic components 40A and 40B and configured to convert the electric charges Qa and Qb output from the force detection element 3 into the voltages Va and Vb. Consequently, the force detection element 3 and the circuit section 4 can be disposed closer to each other. The electric charges Qa and Qb output from the force detection element can be accurately processed with low noise. Therefore, the sensor device 1 can accurately detect a received external force.

As explained above, the circuit section 4 includes, as the electronic components 40A and 40B, at least one of the resistors 41A and 41B to which the electric charges Qa and Qb are input, the capacitors 43A and 43B (the charge accumulating sections) configured to accumulate the electric charges Qa and Qb, and the operational amplifiers 42A and 42B (the amplifiers) configured to amplify voltages by the electric charges Qa and Qb. Therefore, these electric components 40A and 40B are protected from moisture (humidity). It is possible to prevent deterioration and fluctuation in the circuit characteristics of the circuit section 4 (the first circuit section 4A and the second circuit section 4B) due to humidity. Therefore, the sensor device 1 can accurately detect a received external force. In particular, in this embodiment, the circuit section 4 includes all of the resistors 41A and 41B, the capacitors 43A and 43B, and the operational amplifiers 42A and 42B. Therefore, the sensor device 1 can more conspicuously exert the effects explained above. However, not only this, but one or two of the resistor 41A, the capacitor 43A, and the operational amplifier 42A may be omitted from the first circuit section 4A. One or two of the resistor 41B, the capacitor 43B, and the operational amplifier 42B may be omitted from the second circuit section 4B.

As explained above, the force detection element 3 includes the piezoelectric element 31 (the first piezoelectric element) configured to output the electric charge Qa (the first charge) according to an external force in the A-axis direction (the first direction) and the piezoelectric element 32 (the second piezoelectric element) configured to output the electric charge Qb (the second electric charge) according to an external force in the B-axis direction (the second direction different from the A-axis direction). The circuit section 4 includes the first circuit section 4A configured to process the electric charge Qa and the second circuit section 4B configured to process the electric charge Qb. In the plan view (the plan view of the base body 21), the first circuit section 4A is located on one side of the force detection element 3 (the A-axis direction minus side) and the second circuit section 4B is located on the other side (the A-axis direction plus side). By providing the first circuit section 4A and the second circuit section 4B on the opposite sides with respect to the force detection element 3 in this way, the first circuit section 4A and the second circuit section 4B can be disposed to be separated from each other as much as possible. Therefore, interference between the first circuit section 4A and the second circuit section 4B is reduced. It is possible to effectively prevent noise from the second circuit section 4B from being superimposed on the electric charge Qa and, conversely, noise from the first circuit section 4A from being superimposed on the electric charge Qb. Therefore, the electric charge Qa can be accurately processed by the first circuit section 4A. The electric charge Qb can be accurately processed by the second circuit section 4B. As a result, the sensor device 1 can accurately detect a received external force.

The first circuit section 4A being located on one side of the force detection element 3 and the second circuit section 4B being located on the other side means that at least the circuit elements (the resistor 41A, the capacitor 43A, and the circuit element 45A) included in the first circuit section 4A is located on one side (further on the A-axis direction minus side than an imaginary line segment L1 in FIG. 8) of the force detection element 3 and the circuit elements (the resistor 41B, the capacitor 43B, and the circuit element 45B) included in the second circuit section 4B are located on the other side (further on the A-axis direction plus side than an imaginary line segment L2 in FIG. 8) of the force detection element 3. Therefore, for example, a part of the wire 46A may be located further on the A-axis direction plus side than the imaginary line segment L1. A part of the wire 46B may be located further on the A-axis direction minus side than the imaginary line segment L2.

In this embodiment, the force detection element 3 includes the piezoelectric elements 31 and 32. However, not only this, but one of the piezoelectric elements 31 and 32 may be omitted. The circuit section 4 includes the first circuit section 4A and the second circuit section 4B. However, not only this, but one of the first circuit section 4A and the second circuit section 4B may be omitted. If the sensor device 1 includes at least one electronic component 40A or 40B, the circuit section 4 may be omitted. The electronic components 40A and 40B are not limited to electronic components configuring a circuit and may be various sensors such as an acceleration sensor, an angular velocity sensor, a pressure sensor, and a temperature sensor.

As explained above, in the plan view (the plan view of the base body 21), the first circuit section 4A and the second circuit section 4B are symmetrically disposed with respect to the force detection element 3. Consequently, it is possible to substantially equalize circuit characteristics (in this embodiment, charge/voltage conversion characteristics) of the first and second circuit sections 4A and 4B each other. Therefore, the sensor device 1 can extract a signal corresponding to an external force (a shearing force) in the A-axis direction and a signal corresponding to an external force (a shearing force) in the B-axis direction in a well-balanced state and can more accurately detect a received external force.

As explained above, the piezoelectric element 31 and the piezoelectric element 32 respectively include the quartz. Consequently, the configuration of the piezoelectric elements 31 and 32 is simplified. The force detection element 3 has excellent characteristics such as high sensitivity, a wide dynamic range, and high rigidity.

Second Embodiment

A sensor device according to a second embodiment of the invention is explained.

Figure 12:
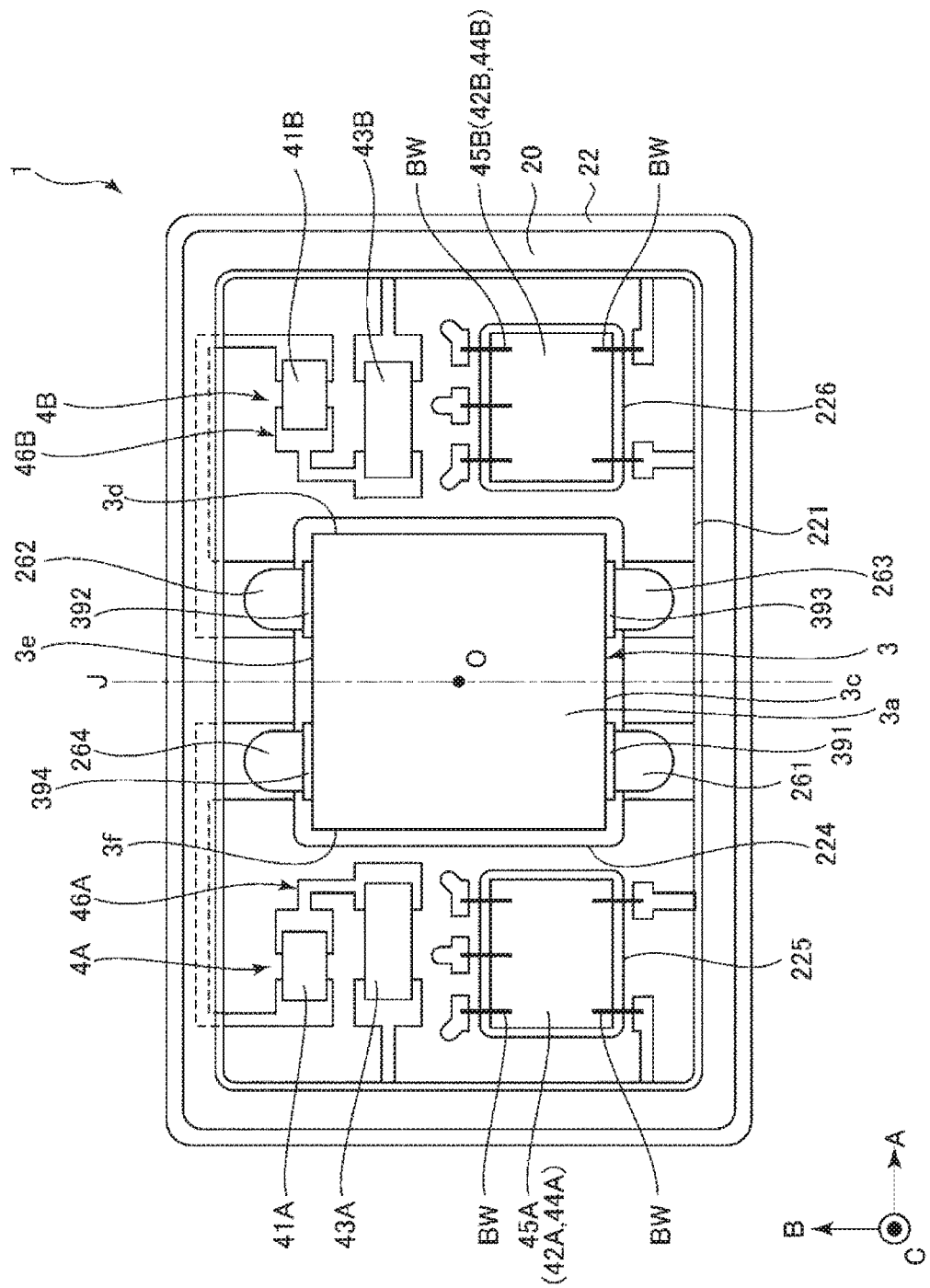
FIG. 12 is a plan view of a sensor device according to a second embodiment of the invention.

FIG. 12 is a plan view of the sensor device according to the second embodiment of the invention.

The sensor device 1 according to this embodiment is the same as the sensor device 1 in the first embodiment mainly except that disposition of the first circuit section 4A and the second circuit section 4B is different. In the following explanation, concerning the sensor device 1 in the second embodiment, differences from the first embodiment are mainly explained. Explanation of similarities to the first embodiment is omitted. In FIG. 12, the same components as the components in the first embodiment are denoted by the same reference numerals and signs.

As shown in FIG. 12, in this embodiment, the first and second circuit sections 4A and 4B are symmetrically disposed with respect to the force detection element 3 in the plan view. Specifically, the first circuit section 4A and the second circuit section 4B are disposed to be symmetrical with respect to an axis J crossing the center O of the force detection element 3 and extending in the B-axis direction in the plan view. Consequently, as in the first embodiment, it is possible to substantially equalize circuit characteristics (wiring lengths, influences from the periphery, etc.), that is, charge/voltage conversion characteristics of the first and second circuit sections 4A and 4B each other. Therefore, the sensor device 1 can extract a signal corresponding to an external force (a shearing force) in the A-axis direction and a signal corresponding to an external force (a shearing force) in the B-axis direction in a well-balanced state and can more accurately detect a received external force.

The first circuit section 4A and the second circuit section 4B being symmetrical disposed with respect to the axis J means that at least the circuit elements (the resistors 41A and 41B, the capacitors 43A and 43B, and the circuit elements 45A and 45B) are symmetrically disposed with respect to the axis J and preferably means that the wires 46A and 46B are further symmetrically disposed with respect to the axis J. The first circuit section 4A and the second circuit section 4B being symmetrically disposed with respect to the axis J means that, for example, errors that could occur in design or manufacturing are included. The symmetry is not always limited to perfect symmetry. This also means that, in the plan view, besides the axis J, which is the symmetry line of the first circuit section 4A and the second circuit section 4B, coinciding with the center O, the axis J deviates from the center O in a range overlapping the force detection element 3 are included.

Since the first circuit section 4A and the second circuit section 4B are symmetrical with respect to the axis J, accordingly, in the force detection element 3, the connection electrode 394 from which the electric charge Qa is output and the connection electrode 392 from which the electric charge Qb is output are disposed on the side surface 3e facing the B-axis direction plus side and the connection electrodes 391 and 393 are disposed on the side surface 3c facing the B-axis direction minus side. Further, the connection member 264 that connects the first circuit section 4A and the connection electrode 394 and the connection member 262 that connects the second circuit section 4B and the connection electrode 392 are disposed on the B-axis direction plus side with respect to the force detection element 3. By adopting such disposition, with relatively simple disposition, it is possible to symmetrically dispose the first circuit section 4A and the second circuit section 4B with respect to the axis J.

According to the second embodiment explained above, it is possible to exert the same effects as the effects in the first embodiment.

Third Embodiment

A sensor device according to a third embodiment of the invention is explained.

Figure 13:
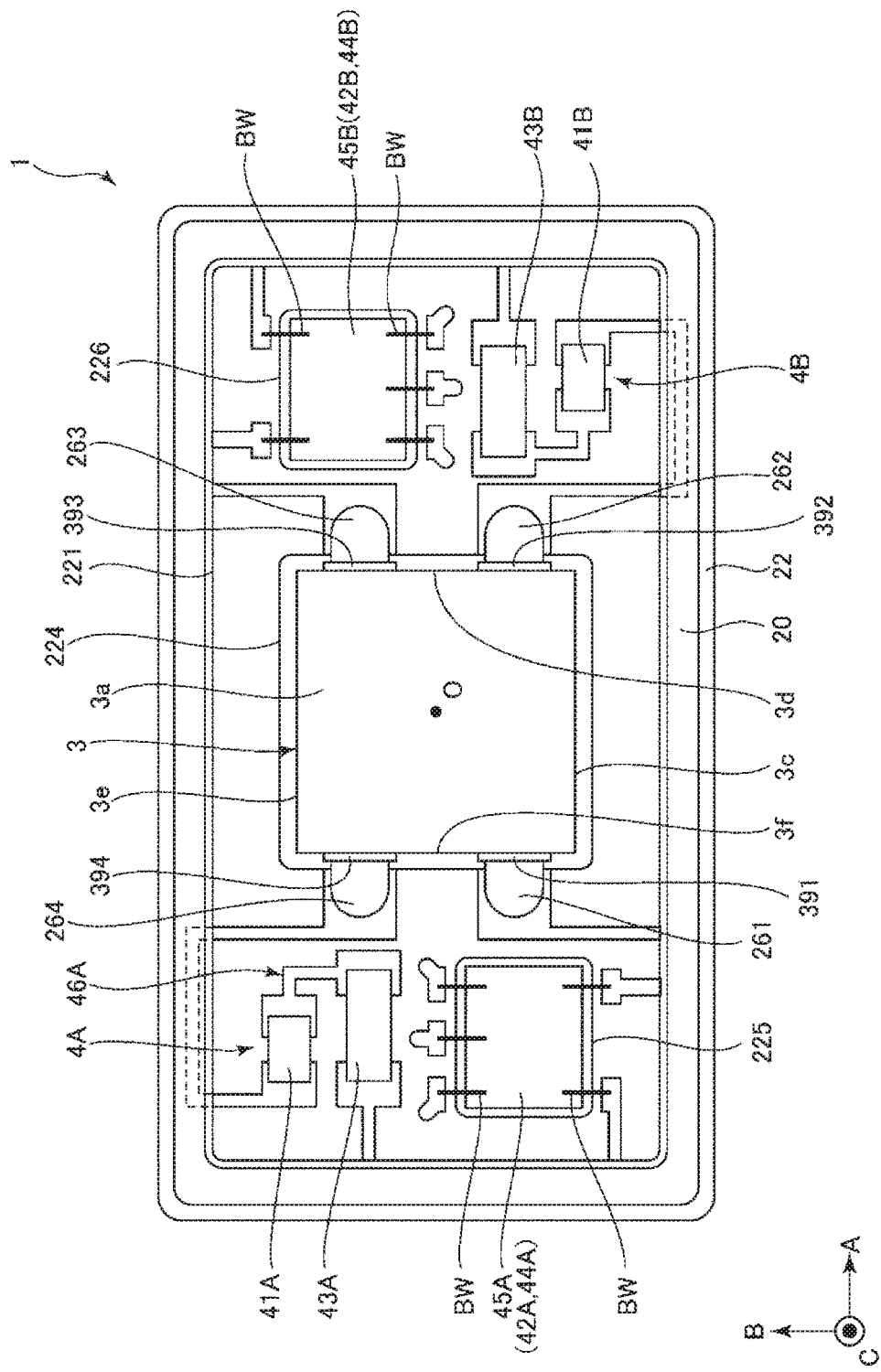
FIG. 13 is a plan view of a sensor device according to a third embodiment of the invention.

FIG. 13 is a plan view of the sensor device according to the third embodiment of the invention.

The sensor device 1 according to this embodiment is the same as the sensor device 1 in the first embodiment except that the configuration of the force detection element 3 is different. In the following explanation, concerning the sensor device 1 in the third embodiment, differences from the first embodiment are mainly explained. Explanation of similarities to the first embodiment is omitted. In FIG. 13, the same components as the components in the first embodiment are denoted by the same reference numerals and signs.

As shown in FIG. 13, in the force detection element 3 of the sensor device 1 in this embodiment, the connection electrodes 391 and 394 are provided on the side surface 3f facing the A-axis direction minus side and the connection electrodes 392 and 393 are provided on the side surface 3d facing the A-axis direction plus side. The connection members 261 and 264 are disposed to be located between the force detection element 3 and the first circuit section 4A on the A-axis direction minus side with respect to the force detection element 3. The connection members 262 and 263 are disposed to be located between the force detection element 3 and the second circuit section 4B on the A-axis direction plus side with respect to the force detection element 3. In such a configuration, as in the first embodiment, the first circuit section 4A and the second circuit section 4B are point-symmetrical with respect to the center O.

With the third embodiment explained above, the same effects as the effects in the first embodiment can be exerted.

Fourth Embodiment

A force detecting device according to a fourth embodiment of the invention is explained.

Figure 14:
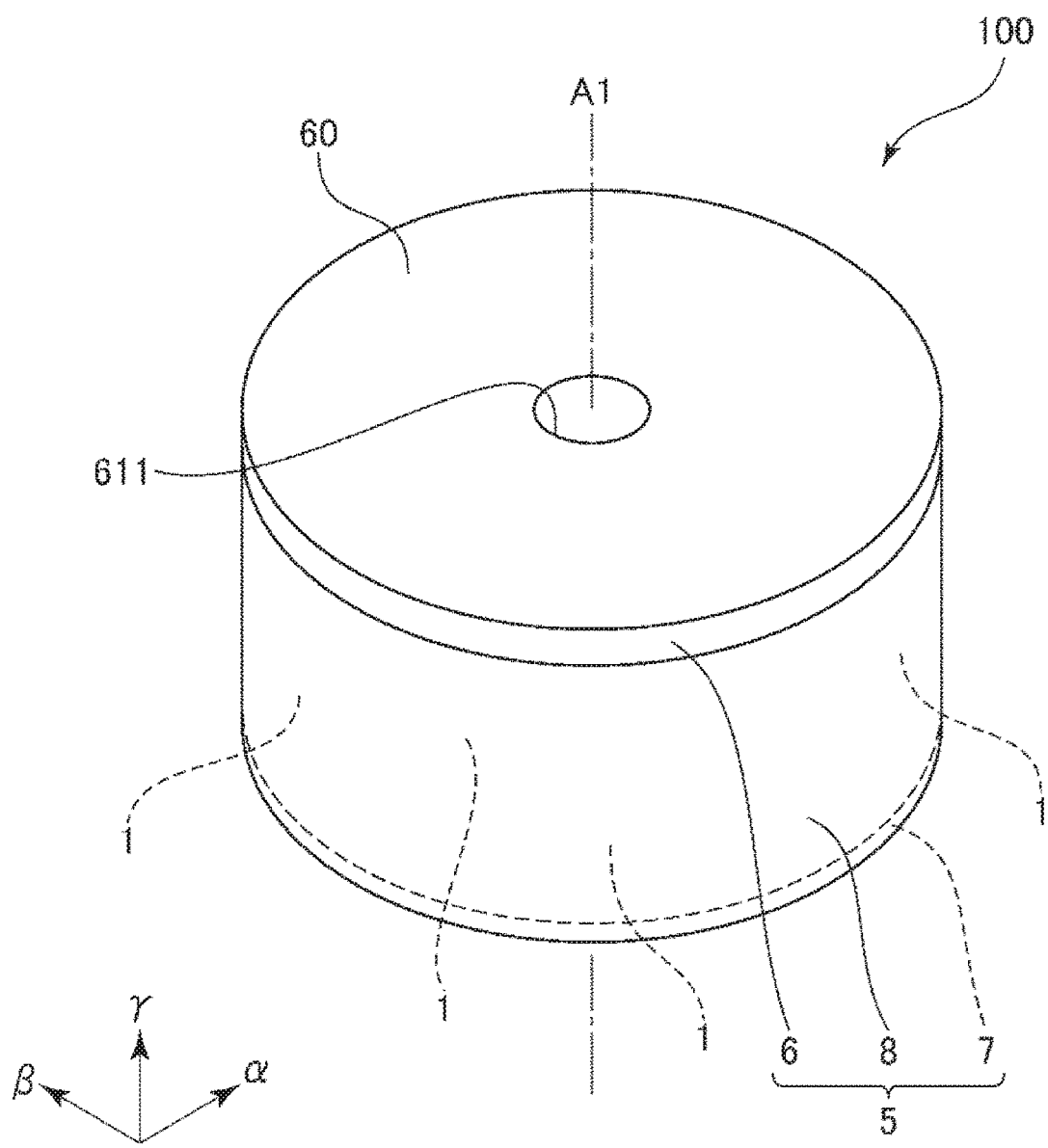
FIG. 14 is a perspective view of a force detecting device according to a fourth embodiment of the invention.
Figure 15:
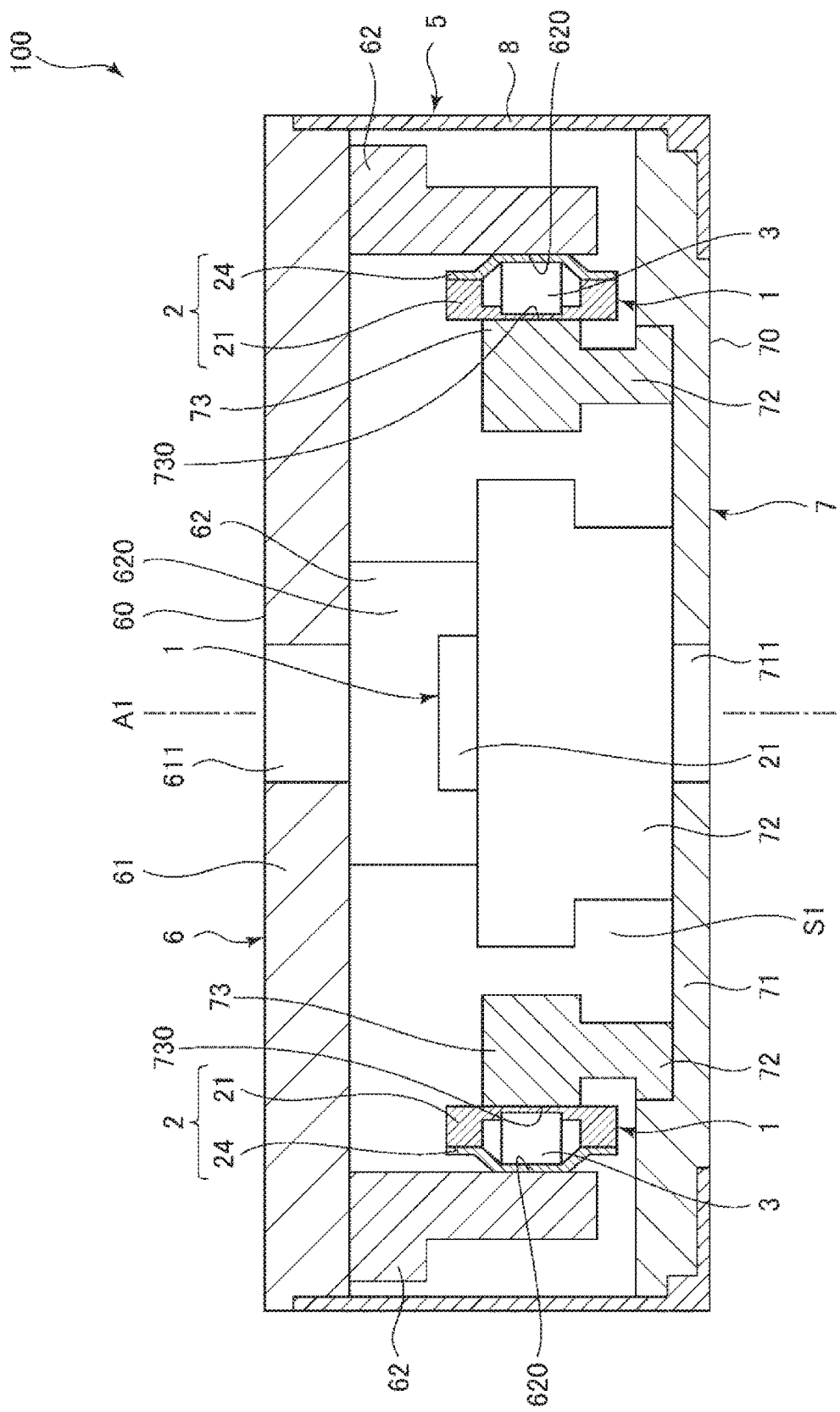
FIG. 15 is a longitudinal sectional view of the force detecting device shown in FIG. 14.
Figure 16:
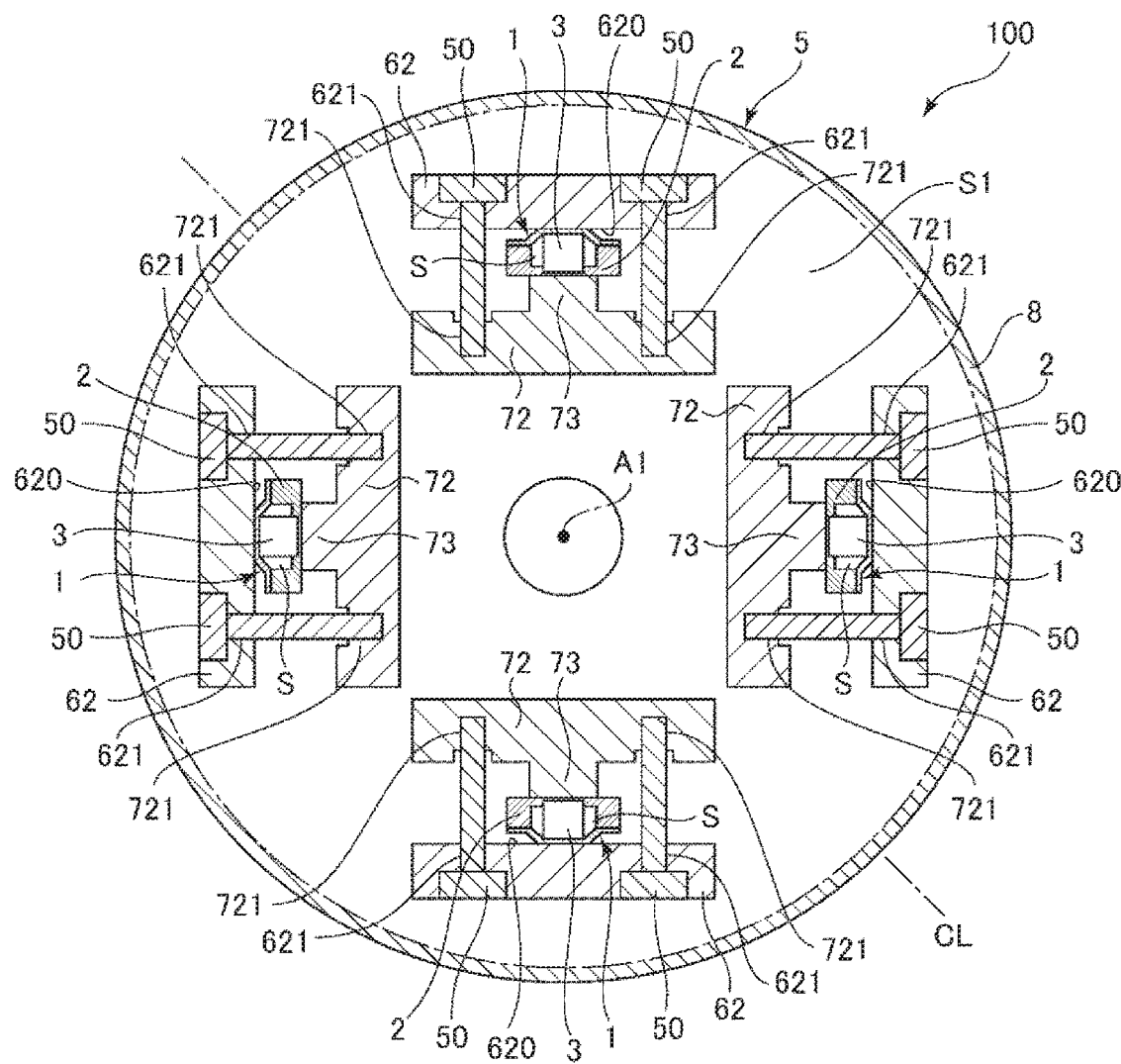
FIG. 16 is a cross sectional view of the force detecting device shown in FIG. 14.

FIG. 14 is a perspective view of the force detecting device according the fourth embodiment of the invention. FIG. 15 is a longitudinal sectional view of the force detecting device shown in FIG. 14. FIG. 16 is a cross sectional view of the force detecting device shown in FIG. 14. FIG. 17 is a sectional view of a sensor device disposed in the force detecting device.

In the following explanation, for convenience of explanation, three axes orthogonal to one another are represented as an α axis, a β axis, and a γ axis. The distal end sides of arrows indicating the axes are represented as a "plus side" and the proximal end sides of the arrows are represented as a "minus side". A direction parallel to the α axis is referred to as "α-axis direction", a direction parallel to the β axis is referred to as "β-axis direction", and a direction parallel to the γ axis is referred to as "γ-axis direction". A γ-axis direction plus side is referred to as "upper" as well and a γ-axis direction minus side is referred to as "lower" as well. A view from the γ-axis direction is referred to as "plan view" as well.

A force detecting device 100 shown in FIG. 14 is a six-axis force sensor capable of detecting six-axis components of an external force applied to the force detecting device 100. The six-axis components include translational force (shearing force) components in respective directions of the three axes (in FIG. 14, the α axis, the β axis, and the γ axis) orthogonal to one another and rotational force (moment) components around the respective three axes.

The force detecting device 100 includes a plurality of (in this embodiment, four) sensor devices 1 disposed at equal intervals (90° intervals) around a center axis A1 of the force detecting device 100 (the γ axis) and a case 5 that houses the sensor devices 1. The force detecting device 100 outputs detection signals corresponding to an external force received by the sensor devices 1 and processes the detection signals.

Consequently, the force detecting device 100 can detect six-axis components of the external force applied to the force detecting device 100. Sections included in the force detecting device 100 are explained below.

Case

As shown in FIG. 14, the case 5 includes first case member 6, a second case member 7 disposed to be spaced apart from the first case member 6, and a sidewall section provided in the outer circumferential portions of the first case member 6 and the second case member 7.

As shown in FIG. 15, the first case member 6 includes a top plate 61 (a first base section) and four wall sections 62 (a first pressurizing section) provided on the lower surface of the top plate 61 and disposed at equal intervals (90° intervals) around the center axis A1. A through-hole 611 extending along the center axis A1 is formed in the center of the top plate 61. As shown in FIG. 16, in the wall sections 62, a plurality of through-holes 621, through which pressurizing bolts 50 explained below are inserted, are formed in the wall sections 62. Inner wall surfaces 620 (surfaces on the inner side) of the wall sections 62 are planes perpendicular to the top plate 61.

As shown in FIG. 15, the second case member 7 includes a bottom plate 71 (a second base section) and four wall sections 72 (a second pressurizing section) provided on the upper surface of the bottom plate 71 and disposed at equal intervals (90° intervals) around the center axis A1 to be opposed to the four wall sections 62. In the bottom plate 71, a through-hole 711 extending along the center axis A1 is formed in the center of the bottom plate 71. The wall sections 72 include projecting sections 73 projecting toward the wall sections 62 side opposed to the wall sections 72. Top surfaces 730 of the projecting sections 73 are parallel to the inner wall surfaces 620 and face the inner wall surfaces 620 at a predetermined distance (a distance for enabling insertion of the sensor device 1) apart from the inner wall surfaces 620. As shown in FIG. 16, a plurality of female screw holes 721, in which the distal end portions of the pressurizing bolts 50 are screwed, are formed in the wall sections 72.

The sidewall section 8 is formed in a cylindrical shape. The upper end portion and the lower end portion of the sidewall section 8 are respectively fixed to the first case member 6 and the second case member 7 by, for example, screwing or fitting. The four sensor devices 1 are housed in a space S1 (an internal space of the force detecting device 100) surrounded by the sidewall section 8 and the top plate 61 of the first case member 6 and the bottom plate 71 of the second case member 7 explained above.

In the case 5 explained above, an upper surface 60 of the first case member 6 functions as, for example, an attachment surface attached to an end effector 1700 (a member to be attached) included in a robot 1000 explained below. A lower surface 70 of the second case member 7 functions as, for example, an arm attachment surface attached to a robot arm 1200 included in the robot 1000 explained below.

The external shape in the plan view of the case 5 is a circle. However, the external shape is not limited to the circle and may be any shape such as a triangle, a square, a polygon such as a pentagon, an ellipse, and irregular shapes. In this embodiment, the wall sections 62 are formed by a member separate from the top plate 61 and fixed to the top plate 61. However, the wall sections 62 are not limited to this and may be formed integral with the top plate 61. Similarly, in this embodiment, the wall sections 72 are formed by members separate from the bottom plate 71 and fixed to the bottom plate 71. However, the wall sections 72 are not limited to this and may be formed integrally with the bottom plate 71.

Constituent materials of the first case member 6, the second case member 7, and the sidewall section 8 are respectively not particularly limited. For example, metal materials such as aluminum and stainless steel and ceramics can be used. The constituent materials of the first case member 6, the second case member 7, and the sidewall section 8 may be the same or may be different.

As shown in FIG. 16, the four sensor devices 1 are disposed to be symmetrical with respect to a line segment CL passing the center axis A1 and parallel to the 0 axis in the plan view. The sensor devices 1 are located between the top plate 61 and the bottom plate 71. The sensor devices 1 are located between the wall sections 62 and the wall sections 72 (the projecting sections 73) and sandwiched by the wall sections 62 and the wall sections 72 (the projecting sections 73). Specifically, as shown in FIG. 17, the sensor devices 1 are disposed between the wall sections 62 and 72 in a state in which the base body 21 of the package 2 is directed to the wall sections 72 side and the lid body 24 is directed to the wall sections 62 side. Further, the bottom member 23 of the base body 21 is in contact with the top surfaces 730 of the projecting sections 73. The center section 241 of the lid body 24 is in contact with the inner wall surfaces 620 of the wall sections 62.

As shown in FIG. 16, the pressurizing bolts 50 couple the wall sections 62 and the wall sections 72. Consequently, the first case member 6 and the second case member 7 are fixed. The pressurizing bolts 50 are tightened, whereby the sensor devices 1 (the force detection elements 3) located between the wall sections 62 and the wall sections 72 are pressurized. That is, in the natural state, a compression force in a direction indicated by an arrow P in FIG. 17 is applied to the force detection element 3. By preloading the force detection element 3 in this way in the natural state, it is possible to accurately detect six-axis components of an external force applied to the force detecting device 100. The preload applied to the force detection element 3 can be adjusted by adjusting a fastening force of the pressurizing bolts 50 as appropriate.

A pair of pressurizing bolts 50 is provided for each sensor device 1. The pair of pressurizing bolts 50 is located on both sides of the sensor device 1. However, disposition of the pressurizing bolts 50 is not particularly limited. The pressurizing bolts 50 only have to be provided according to necessity. When unnecessary, the pressurizing bolts 50 may be omitted.

Such a force detecting device 100 includes a not-shown external force detection circuit. The external force detection circuit can detect (calculate), on the basis of voltages Va and Vb output from the sensor devices 1, a translational force component Fα in the α-axis direction, a translational force component Fβ in the β-axis direction, a translational force component Fγ in the γ-axis direction, a rotational force component Mα around the α axis, a rotational force component Mβ around the β axis, and a rotational force component Mγ around the γ axis. The external force detection circuit can include, for example, an AD converter and an arithmetic circuit such as a CPU connected to the AD converter.

The force detecting device 100 is explained above. As explained above, such a force detecting device 100 includes the top plate 61 (the first base section), the bottom plate 71 (the second base section), and the sensor device 1 (the sensor device according to the invention) provided between the top plate 61 and the bottom plate 71. With such a force detecting device 100, since the force detecting device 100 includes the sensor device 1, it is possible to more highly accurately detect an external force.

Fifth Embodiment

A robot according to a fifth embodiment of the invention is explained.

Figure 18:
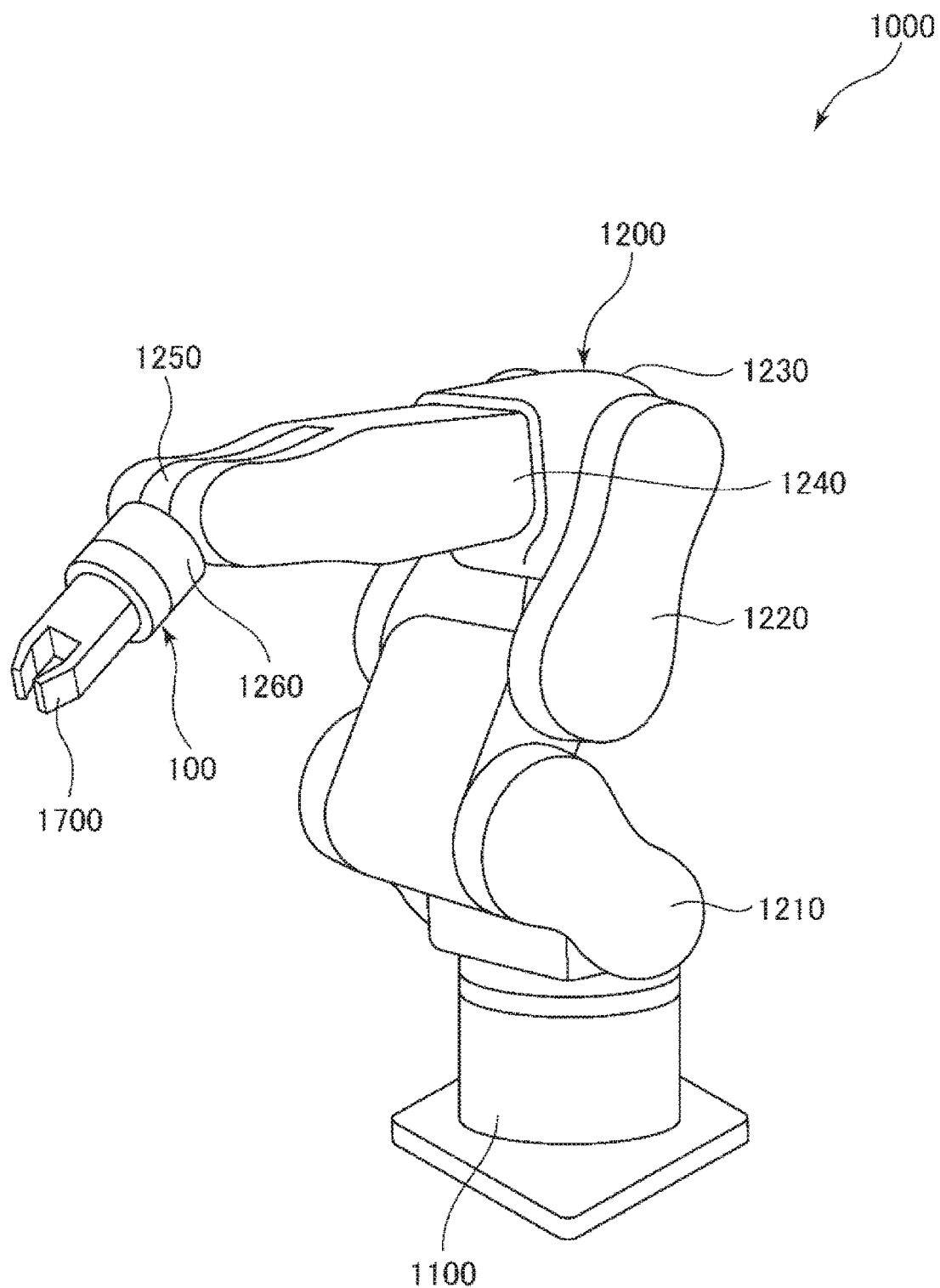
FIG. 18 is a perspective view of a robot according to a fifth embodiment of the invention.

FIG. 18 is a perspective view of the robot according to the fifth embodiment.

The robot 1000 shown in FIG. 18 can perform work such as supply, removal, conveyance, and assembly of target objects such as a precision instrument and components configuring the precision instrument. The robot 1000 is a single-arm robot and is, a so-called six-axis vertically articulated robot. The robot 1000 includes a pedestal 1100, the robot arm 1200 turnably coupled to the pedestal 1100, the force detecting device 100, and the end effector 1700.

The pedestal 1100 is a portion fixed to, for example, a floor, a wall, a ceiling, and a movable truck. The robot arm 1200 includes an arm 1210 (a first arm), an arm 1220 (a second arm), an arm 1230 (a third arm), an arm 1240 (a fourth arm), an arm 1250 (a fifth arm), and an arm 1260 (a sixth arm). The arms 1210 to 1260 are coupled in this order from the proximal end side to the distal end side of the robot arm 1200. The arms 1210 to 1260 are turnable with resect to arms adjacent to one another or the pedestal 1100.

The force detecting device 100 is connected to the distal end of the arm 1260. The force detecting device 100 detects a force (including a moment) applied to the end effector 1700 attached to the distal end of the force detecting device 100. The end effector 1700 is an instrument for performing work on a target object, which is a work target of the robot 1000. The end effector 1700 is configured by a hand having a function of gripping the target object. As the end effector 1700, an instrument corresponding to work content or the like of the robot 1000 only has to be used. The end effector 1700 is not limited to the hand. The end effector 1700 may be, for example, a screw tightening instrument for performing screw tightening or a fitting instrument for performing fitting.

Although not shown in FIG. 18, the robot 1000 includes a driving section including a motor that turns one arm with respect to the other arm (or the pedestal 1100). Although not shown in FIG. 18, the robot 1000 includes an angle sensor that detects a rotation angle of a rotating shaft of a motor.

The robot 1000 is explained above. As explained above, such a robot 1000 includes the pedestal 1100, the robot arm 1200 (the arm) connected to the pedestal 1100, and the force detecting device 100 (the force detecting device according to the invention). With such a robot 1000, since the robot 1000 includes the force detecting device 100, it is possible to more precisely execute work by feeding back an external force detected by the force detecting device 100 to a control section (not shown in FIG. 18) having a function of controlling the robot 1000. The robot 1000 can detect, for example, contact with an obstacle of the end effector 1700 according to the external force detected by the force detecting device 100. Therefore, it is possible to easily perform an obstacle avoiding operation, a target object damage avoiding operation, and the like. The robot 1000 can more safely execute work.

The force detecting device 100 may be provided between arms adjacent to each other (e.g., between the arms 1240 and 1250). The robot 1000 may be other robots such as a SCARA robot and a double-arm robot. The number of arms of the robot 1000 is six in this embodiment. However, the number of arms is not limited to this and may be one to five or seven or more.

The embodiments of the invention with respect to the sensor device, the force detection device and the robot are explained above based on the drawings. However, the invention is not limited to the embodiment. The components of the sections can be replaced with any components having the same functions. Any other components may be added to the invention. The sensor device and the force detecting device according to the invention can be incorporated in apparatuses other than the robot and may be mounted on a mobile body such as an automobile.

The entire disclosure of Japanese Patent Application No. 2018-035257, filed Feb. 28, 2018, is expressly incorporated by reference herein.

What is claimed is:

1. A sensor device comprising:
   a base body including a recess;
   a lid body configured to close an opening of the recess;
   a force detection element disposed in the recess and configured to output an electric charge according to a received external force; and
   an electronic component disposed in the recess and electrically connected to the force detection element, wherein
   a separation distance between the electronic component and the lid body is larger than a separation distance between the force detection element and the lid body in a thickness direction of the lid body.

2. The sensor device according to claim 1, wherein the lid body includes, in a plan view from the thickness direction of the lid body:
   a center area;
   an outer edge area formed in a frame shape surrounding the center area and joined to the base body; and
   a frame-like connecting area located between the center area and the outer edge area and connecting the center area and outer edge area, and
   the force detection element and the electronic component overlap the center area in the plan view.

3. The sensor device according to claim 2, wherein, in a sectional view from a direction orthogonal to the thickness direction of the lid body, the connecting area is formed in a taper shape that connects an outer edge of the center area and an inner edge of the outer edge area.

4. The sensor device according to claim 1, further comprising a seal located between the base body and the lid body and configured to join the base body and the lid body, wherein
   in a sectional view, a joining surface of the seal with the lid body is located between an end on the lid body side of the force detection element and an end on the lid body side of the electronic component.

5. The sensor device according to claim 1, wherein
   the recess is sealed by the lid body, and
   an inside of the recess is in a decompressed state.

6. The sensor device according to claim 5, wherein an air pressure in the recess is 0.01 Pa or more and 1000 Ps or less.

7. The sensor device according to claim 1, wherein an inert gas is filled in the recess.

8. The sensor device according to claim 1, further comprising a circuit configured to convert the electric charge output from the force detection element into a voltage.

9. The sensor device according to claim 8, wherein the circuit section includes, as the electronic component, a resistor to which the electric charge is input, a capacitor that accumulates the electric charge, or an amplifier that amplifies a voltage by the electric charge.

10. The sensor device according to claim 8, wherein
the force detection element includes:
a first piezoelectric element configured to output a first electric charge according to an external force in a first direction; and
a second piezoelectric element configured to output a second electric charge according to an external force in a second direction different from the first direction,
the circuit includes:
a first circuit configured to process the first electric charge; and
a second circuit configured to process the second electric charge, and
in a plan view of the base body, the force detection element is located between the first circuit and the second circuit.

11. The sensor device according to claim 10, wherein, in a plan view of the base body, the first circuit and the second circuit are disposed symmetrically with respect to the force detection element.

12. The sensor device according to claim 10, wherein the first piezoelectric element and the second piezoelectric element include quartz.

13. A force detecting device comprising:
a top plate;
a bottom plate;
a sensor device sandwiched by the top plate and the bottom plate; and
a bolt configured to fasten the top plate and the bottom plate, wherein
the sensor device includes
a base body including a recess,
a lid body configured to close an opening of the recess,
a force detection element disposed in the recess and configured to output an electric charge according to a received external force, and
an electronic component disposed in the recess and electrically connected to the force detection element, and
a separation distance between the electronic component and the lid body is larger than a separation distance between the force detection element and the lid body in a thickness direction of the lid body.

14. The force detecting device according to claim 13, wherein the lid body includes, in a plan view from the thickness direction of the lid body:
a center area;
an outer edge area formed in a frame shape surrounding the center area and joined to the base body; and
a frame-like connecting area located between the center area and the outer edge area and connecting the center area and outer edge area, and
the force detection element and the electronic component overlap the center area in the plan view.

15. The force detecting device according to claim 14, wherein, in a sectional view from a direction orthogonal to the thickness direction of the lid body, the connecting area is formed in a taper shape that connects an outer edge of the center area and an inner edge of the outer edge area.

16. The force detecting device according to claim 13, wherein the sensor device further includes a seal located between the base body and the lid body and configured to join the base body and the lid body, wherein
in a sectional view, a joining surface of the seal with the lid body is located between an end on the lid body side of the force detection element and an end on the lid body side of the electronic component.

17. A robot comprising:
a pedestal;
an arm connected to the pedestal; and
a force detecting device connected to the arm and including
a top plate,
a bottom plate,
a sensor device sandwiched by the top plate and the bottom plate, and
a bolt configured to fasten the top plate and the bottom plate, wherein
the sensor device includes
a base body including a recess,
a lid body configured to close an opening of the recess,
a force detection element disposed in the recess and configured to output an electric charge according to a received external force, and
an electronic component disposed in the recess and electrically connected to the force detection element, and
a separation distance between the electronic component and the lid body is larger than a separation distance between the force detection element and the lid body in a thickness direction of the lid body.

18. The robot according to claim 17, wherein the lid body includes, in a plan view from the thickness direction of the lid body:
a center area;
an outer edge area formed in a frame shape surrounding the center area and joined to the base body; and
a frame-like connecting area located between the center area and the outer edge area and connecting the center area and outer edge area, and
the force detection element and the electronic component overlap the center area in the plan view.

19. The robot according to claim 18, wherein, in a sectional view from a direction orthogonal to the thickness direction of the lid body, the connecting area is formed in a taper shape that connects an outer edge of the center area and an inner edge of the outer edge area.

20. The robot according to claim 17, wherein the sensor device further includes a seal located between the base body and the lid body and configured to join the base body and the lid body, wherein
in a sectional view, a joining surface of the seal with the lid body is located between an end on the lid body side of the force detection element and an end on the lid body side of the electronic component.

* * * * *